(12) United States Patent
Zamarato et al.

(10) Patent No.: US 12,130,894 B2
(45) Date of Patent: Oct. 29, 2024

(54) OPERATING SYSTEM-LEVEL ASSISTIVE FEATURES FOR CONTEXTUAL PRIVACY

(71) Applicant: Google LLC, Mountain View, CA (US)

(72) Inventors: Marco Zamarato, San Francisco, CA (US); Kara Gates, Mountain View, CA (US); Sameer Bansal, San Francisco, CA (US); Chrisoula Kapelonis, Mountain View, CA (US); Evan Malahy, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 215 days.

(21) Appl. No.: 17/758,188

(22) PCT Filed: Dec. 29, 2020

(86) PCT No.: PCT/US2020/070957
§ 371 (c)(1),
(2) Date: Jun. 29, 2022

(87) PCT Pub. No.: WO2021/138635
PCT Pub. Date: Jul. 8, 2021

(65) Prior Publication Data
US 2023/0027580 A1   Jan. 26, 2023

Related U.S. Application Data

(60) Provisional application No. 62/955,767, filed on Dec. 31, 2019, provisional application No. 62/955,772, filed on Dec. 31, 2019.

(51) Int. Cl.
*G06F 21/12*   (2013.01)
*G06F 9/30*    (2018.01)
*G06F 9/48*    (2006.01)

(52) U.S. Cl.
CPC ........ *G06F 21/126* (2013.01); *G06F 9/30123* (2013.01); *G06F 9/4881* (2013.01)

(58) Field of Classification Search
CPC .. G06F 21/126; G06F 9/30123; G06F 9/4881; G06F 9/5005; G06F 9/547; H04L 67/12; H04L 67/60; H04L 67/10
See application file for complete search history.

(56) References Cited

U.S. PATENT DOCUMENTS

| 2015/0095774 A1 | 4/2015 | Bates et al. |
| 2017/0357529 A1 | 12/2017 | Venkatraman et al. |

(Continued)

FOREIGN PATENT DOCUMENTS

| CN | 109074206 A | 12/2018 |
| JP | 2005339174 A | 12/2005 |

(Continued)

OTHER PUBLICATIONS

International Search Report and Written Opinion for PCT Application No. PCT/US2020/070957, mailed on Mar. 9, 2021, 13 pages.

(Continued)

*Primary Examiner* — El Hadji M Sall
(74) *Attorney, Agent, or Firm* — Brake Hughes Bellermann LLP

(57) ABSTRACT

Systems and methods are described that include operations such as detecting a plurality of computing devices configured as a distributed ambient computing system, receiving a request to execute a computing task, obtaining, from the distributed ambient computing system, data representing a device context for at least two of the plurality of devices, generating a combined context corresponding to the distributed ambient computing system, the combined context representing a combination of the device context for the at least two devices, generating and providing at least one decision (Continued)

request based on the computing task and the combined context, receiving a response to the at least one decision request, and triggering execution of the computing task based on the response and the combined context.

20 Claims, 25 Drawing Sheets

(56) References Cited

U.S. PATENT DOCUMENTS

| | | | |
|---|---|---|---|
| 2018/0373568 A1 | 12/2018 | Frost | |
| 2019/0020973 A1* | 1/2019 | Harish | G08G 1/0112 |
| 2020/0133711 A1* | 4/2020 | Webster | G06F 8/30 |
| 2020/0356243 A1* | 11/2020 | Meyer | G06F 9/4881 |
| 2021/0191779 A1* | 6/2021 | Zamarato | G06F 9/48 |

FOREIGN PATENT DOCUMENTS

| | | |
|---|---|---|
| KR | 101759196 B1 | 7/2017 |
| WO | 2017218437 A1 | 12/2017 |

OTHER PUBLICATIONS

Office Action for Japanese Application No. 2022-540486 (with English translation), mailed Apr. 16, 2024, 9 pages.
Notice of Allowance (with English translation) for CN Application No. 202080091160.5, mailed May 13, 2024, 6 pages.
Liu, et al., "Adaptive Privacy Protection Policy of Location-aware", Computer and Engineering and Design, vol. 32, No. 3, 2011, pp. 839-842.

* cited by examiner

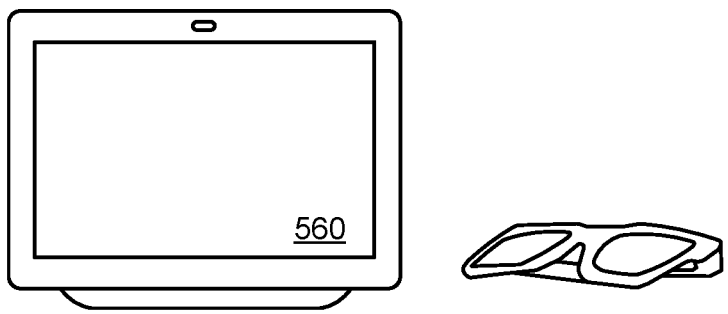

| | 558 |
|---|---|
| "User B left a note, he's doing homework at the neighbor's…' | |

| RELEVANT CONTENT | HUMAN TO HUMAN MEDIATION | SUMMARIZATION |
|---|---|---|

| User A 562 | DEVICE-- Communal, touchscreen, mic, speaker, camera, Medium display 564 |
|---|---|
| RECENT ACTIVITY User B left a note 566 | ONGOING-ACTIVITY 568 Check family status |
| HOUSEHOLD (COMPOSITION + DEVICES + STATE) 570 Registered: User A, User B + hub, thermostat, smoke detector + Home currently includes User A, permission policy configured | |

FIG. 5D

"No, please just let User B know that I got home" 588

| HUMAN TO HUMAN MEDIATION 589 | MINDFUL NOTIFICATION 590 |
|---|---|
| User A 591 | DEVICE 592 Communal, touchscreen, microphone, speaker, camera, Small display |
| RECENT ACTIVITY 593 User B left a note | ONGOING-ACTIVITY 594 Check family status |
| HOUSEHOLD (COMPOSITION + DEVICES + STATE) 595 Registered: User A, User B hub, thermostat, smoke detector Home includes User A, permission policy configured | |

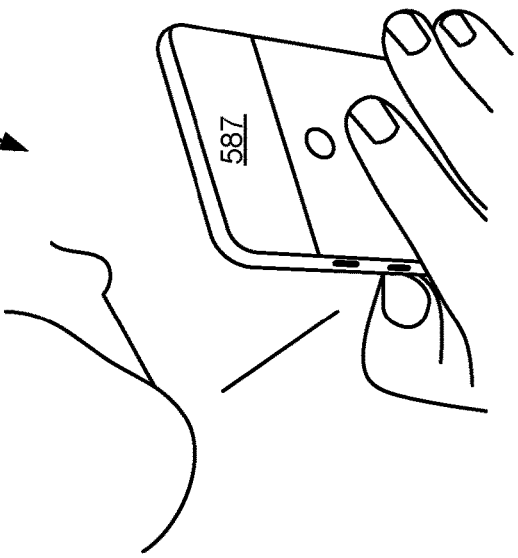

FIG. 5F

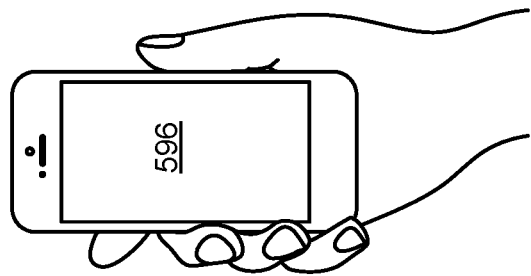

| User B gets notified | |
|---|---|
| HUMAN TO HUMAN MEDIATION | MINDFUL NOTIFICATION |
| User A | DEVICE<br>Communal, touchscreen, microphone, speaker, camera, Small display |
| RECENT ACTIVITY<br>Notification sent to User B | ONGOING-ACTIVITY<br>Assistant |
| HOUSEHOLD (COMPOSITION + DEVICES + STATE)<br>Registered: User A, User B hub, thermostat, smoke detector<br>Home includes User A; permission policy configured | |

FIG. 5G

OPERATING SYSTEM-LEVEL ASSISTIVE FEATURES FOR CONTEXTUAL PRIVACY

CROSS-REFERENCE TO RELATED APPLICATIONS

This application is a 35 U.S.C. § 371 National Phase Entry Application from PCT/US2020/070957, filed on Dec. 29, 2020, entitled "OPERATING SYSTEM-LEVEL ASSISTIVE FEATURES FOR CONTEXTUAL PRIVACY", which claims priority to and the benefit of U.S. Provisional Patent Application No. 62/955,767, filed on Dec. 31, 2019, entitled "OPERATING SYSTEM-LEVEL ASSISTIVE FEATURES FOR CONTEXTUAL PRIVACY", and claims priority to and the benefit of U.S. Provisional Patent Application No. 62/955,772, filed on Dec. 31, 2019 entitled "OPERATING SYSTEM-LEVEL ASSISTIVE FEATURES FOR HOUSEHOLD ACCOUNTS," the disclosures of which are incorporated herein by reference in their entireties.

BACKGROUND

Traditional electronic devices may execute software using an operating system. For example, a mobile phone device may be configured to operate hardware and onboard software with a dedicated operating system that communicates amongst hardware components on the device. Such an operating system is typically intended to control and manage software and hardware functions on the devices. Other electronic devices may operate in the same manner executing software for each respective separate device using the respective onboard device operating system.

SUMMARY

The systems and methods described herein provide for a distributed ambient computing platform for operating ambient computing devices (e.g., electronic devices) together as a distributed computing system. The platform may function as a framework in which the operating systems of each of the electronic devices (e.g., computing devices, ambient devices, etc.) can be configured to execute and/or share data, household accounts, contexts, and/or tasks (e.g., computing actions), amongst the devices using context-aware computing techniques. The sharing of data, household accounts, contexts, and/or computing tasks may be based on local sharing within a user-controlled and user-defined environment of devices (e.g., the distributed ambient computing platform. Sharing of data, contexts, tasks, and analysis of any of such elements may be performed securely (e.g., cryptographically secured) within and upon the devices of the home and may not be distributed to service providers or other storage elements without explicit user permission. In some implementations, the platform may function as a framework in which the operating systems of each of the electronic devices (e.g., computing devices, ambient devices, etc.) can be configured to execute and/or share data, contexts, policies, rules, and/or tasks (e.g., computing tasks or actions), amongst the devices within a particular defined location (e.g., building, household structure, school, office building, home, etc.) associated with the distributed computing system.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In a first general aspect, a computer-implemented method is described that includes detecting a plurality of computing devices configured as a distributed ambient computing system, receiving a request to execute a computing task, obtaining, from the distributed ambient computing system, data representing a device context for at least two of the plurality of devices, generating a combined context corresponding to the distributed ambient computing system, the combined context representing a combination of the device context for the at least two devices, generating and providing at least one decision request based on the computing task and the combined context, receiving a response to the at least one decision request, and triggering execution of the computing task based on the response and the combined context.

These and other aspects can include one or more of the following, alone or in combination. For example, the computing task may be to configure a service on the at least two devices, the data may include a device type and an operating system for each of the at least two devices, the combined context may include an indication for whether or not each of the at least two devices are available for use, and the at least one decision request may be a query indicating whether the computing task is to be performed on the at least two devices. In response to detecting a confirmation to perform the computing task on the at least two devices, the method, system, or computer-readable medium may include configuring the service for the at least two devices.

In some implementations, the method may further include distributing the combined context to the plurality of computing devices configured as the distributed ambient computing system. Distributing the combined context may trigger execution of the computing task on two or more of the plurality of devices.

In some implementations, the at least two devices are selected based on a determined physical location of each respective device and the combined context is used to configure the at least two devices to function together to execute the computing task. In some implementations, the request may include a verbal request, the combined context may further represent the plurality of computing devices configured for the distributed ambient computing system, and the computing task is distributed for completion on two or more of the plurality of computing devices based on the combined context.

In some implementations, the device context is based at least in part on device capabilities, preconfigured permissions, and device location. In some implementations, the combined context is generated in response to determining that the at least two devices are configured to operate together to perform the computing task. In some implementations, the combined context is configured to enable the plurality of devices to trigger a private mode according to preconfigured permissions associated with the distributed ambient computing system, the private mode being configured to invoke the preconfigured permissions to obfuscate content associated with each respective device and block access to one or more functions associated with each respective device. In some implementations, the distributed ambient computing system is configured for a building associated with the plurality of computing devices, the distributing ambient computing system providing a digital identity for the building.

The systems and aspects above may be configured to perform any combination of the above-described aspects, each of which may be implemented together with any suitable combination of the above-listed features and aspects. Implementations of the described techniques may include hardware, a method or process, or computer software on a computer-accessible medium. The details of one or more implementations are set forth in the accompanying drawings and the description below. Other features will be apparent from the description and drawings, and from the claims.

BRIEF DESCRIPTION OF THE DRAWINGS

FIGS. 5A-5G are block diagrams illustrating example use of context to generate information for a user operating one or more devices within a distributed ambient computing system, in accordance with implementations described herein.

The use of similar or identical reference numbers in the various drawings is intended to indicate the presence of a similar or identical element or feature.

DETAILED DESCRIPTION

Figure 1A:
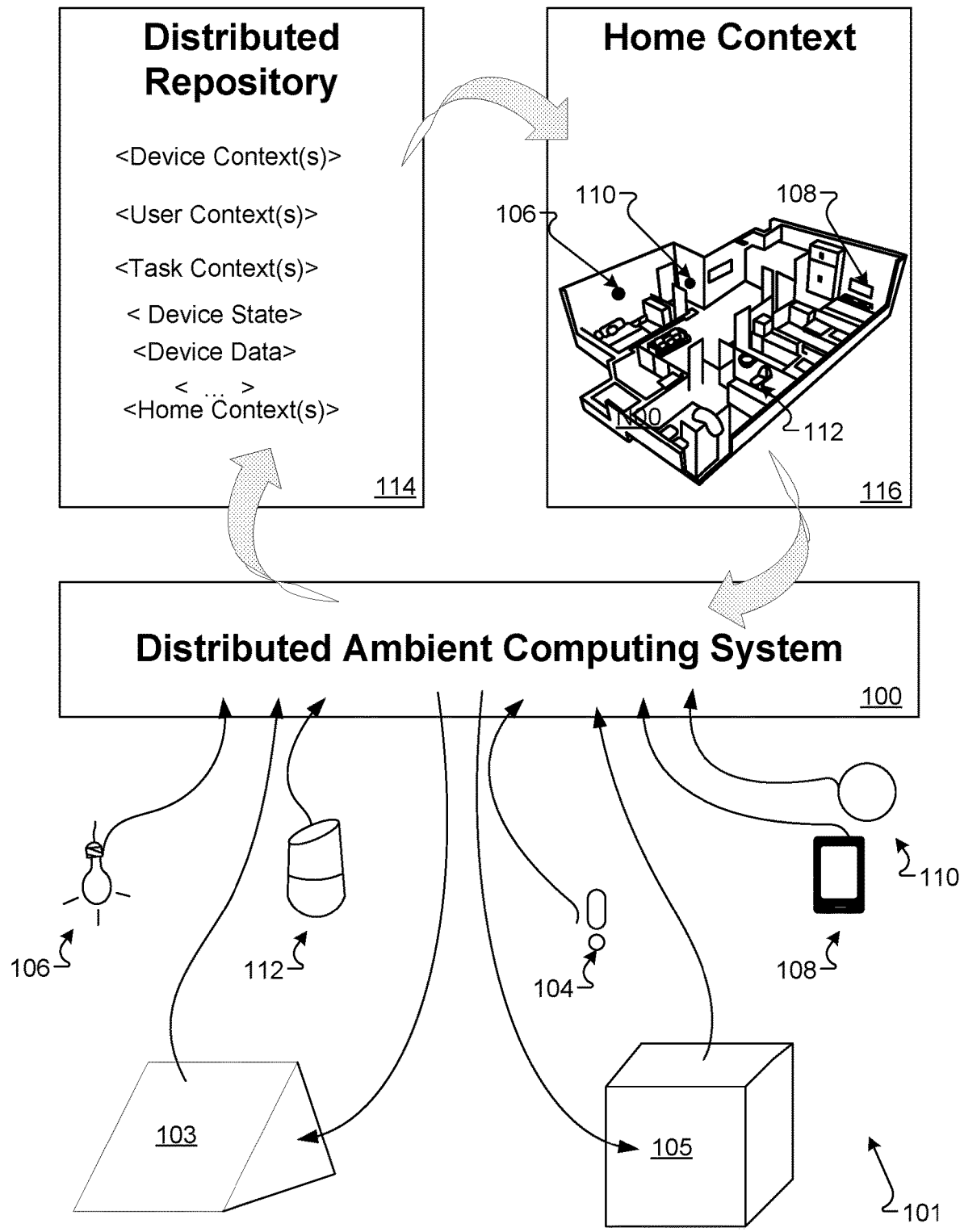
FIGS. 1A-1B are block diagrams illustrating an example contextually aware distributed ambient computing systems, in accordance with implementations described herein.

This document describes a distributed ambient computing platform for operating ambient computing devices (e.g., electronic devices) together as a distributed computing system. The platform may function as a framework in which the operating systems of each of the electronic devices (e.g., computing devices, ambient devices, etc.) can be configured to execute and/or share data, contexts, and/or tasks (e.g., computing tasks or actions), amongst the devices using context-aware computing techniques. The sharing of data, contexts, and/or computing tasks may be based on local sharing within a user-controlled and user-defined environment of devices (e.g., the distributed ambient computing platform (e.g., system)). The user accesses controls associated with the devices and/or systems described herein to set permissions (e.g., user configured permissions) for sharing amongst user-owned (e.g., household owned) devices. Such permissions may limit or stop the use of the shared data, contexts, and computing tasks. For example, sharing of data, contexts, computing tasks, and analysis of any of such elements may be performed securely (e.g., cryptographically secured) within and upon the devices of the home and may not be distributed to service providers or other storage elements without explicit user permission. In some implementations, the platform may function as a framework in which the operating systems of each of the electronic devices (e.g., computing devices, ambient devices, etc.) can be configured to execute and/or share data, contexts, policies, rules, and/or computing tasks (e.g., actions), amongst the devices within a particular defined location (e.g., building, household structure, school, office building, home, etc.) associated with the distributed computing system.

The platform may enable the use of software and/or hardware on one or more of the devices to collect and analyze data, using the user-enabled permissions. In some implementations, if user-based permissions are not configured, the systems described herein may ask at each request whether or not to share, use, collect, or store, particular information associated with users and/or user actions in the system. In addition, each interaction described herein may be carried out based on user-enabled permissions or in the absences of such a configuration of permissions, the systems described herein may provide questions and UI information to actively request user permissions to carry out such interactions and related tasks.

The data may remain amongst the devices of the home, for example, for use in determining a context of a user environment in which devices are located. In general, the systems and methods described herein can utilize such information to securely determine and present contextually relevant and actionable information to a user associated with one or more of the devices. The platform may be used to assess and generate contexts that are useful, interoperable, transparent, and secure for the users and devices accessing the distributed ambient computing system described herein.

The systems and methods described herein may determine and combine signals from one or more devices and may use the combined signals to generate a single home context that can then be used to suggest and/or automate actions that enhance device experience for a user while maintaining user and device privacy according to user configured permissions. In some implementations, one or more individual device contexts can be distributed amongst one or more of the devices via the operating system (O/S) of the respective device. The distribution of the device context may be based on one or more device capabilities (e.g., sensors, processing capabilities, hardware, software), policies, user preferences, user permissions, requests, user location, etc. Each device in the home may be defined as a set of inputs, a set of outputs, and a set of device capabilities in addition to a device context.

In some implementations, the systems and methods described herein may select one or more devices for task execution based on capabilities of the devices, available memory/bandwidth and the like. In some implementations, the systems and methods described herein may select one or more devices for task execution based on whether the devices are frequently used for that type of task. In some implementations, the systems and methods described herein may dispatch a task to more than one device. For example, the task can be split into sub-tasks for executing on two or more devices. In some implementations, sub-tasks may be carried out on more than one device simultaneously. For example, if the task is to play a particular playlist on all devices in a building, the systems and methods described herein can indicate which devices (or whether each particular device) executes the task or sub-task of playing the playlist. The sub-tasks can be dispatched to devices based on several factors including, but not limited to device capability, user permissions, distributed ambient computing status or order, and/or other user-indicated device configuration.

The systems and methods described herein may enable each device in the home to participate in building a home-wide description of a context for the home and for use within the home according to user-enabled permissions. Devices can recognize different human activities according to user permissions to further enhance the determined device context. For example, users may permit devices to monitor and/or sense particular elements around a home as well as permit storage and use of information pertaining to device use according to such permissions. In some implementations, such devices may be configured by the user to trigger private modes for ambient devices to ensure that any data or sensor output is either enabled or disabled for sharing and/or use according to user permissions and/or settings. For example, a private mode may be triggered according to user-initiated and user-defined device usage policies. In some implementations, all devices may operate in such a private mode until requested, by a device owner, to do otherwise.

The systems and methods described herein may use a different paradigm than conventional systems to determine device and/or user contexts within the distributed ambient computing system. For example, the systems and methods described herein may configure electronic devices to function together, according to determined contexts, and as a distributed ambient computing system (e.g., network of devices), rather than operate using conventional device interactions where each device typically operates using different hard coded operating systems that may not be compatible for communicating and sharing computing tasks amongst the devices. As a result, there may an increase in communication efficiency between the electronic devices and a reduction in the amount of data transferred based on the knowledge gained by generating the contexts as described herein.

In conventional systems, each device may collect and consume context independently, which can allow a device in one room to use an onboard proximity sensor to detect presence in front of the device, but the device may not be privy to other activities occurring on other devices in the home. The systems and methods herein may solve the technical challenge (e.g., problem) of determining device context with respect to other device contexts by leveraging the distributed ambient computing system to combine device contexts, device signals, etc. into a single home-wide context that represents the overall status of the home.

Such a signal combination may include generating a central and secure repository of context(s) that may be managed by the platform described herein. The distributed repository may store the contexts for any number of devices associated with a user environment. The context may be built around a shared schema that allows for interoperability and contribution of data, mediated by the distributed ambient computing system having access to O/S level architectures of the devices.

The repository of context(s) may be a distributed repository shared amongst other devices and/or network-based logging including, but not limited to blockchain, transparent ledgers (e.g., logs), or other sharable storage scheme. The device contexts may be reported from each individual device via a shared schema to the distributed repository. In some implementations, one or more heuristics or software code may be configured to analyze the context signals received at the distributed repository. The analysis may result in generation of an abstract description of various activities occurring in the home, for example. Such analysis and generation of the description is performed according to user consent and/or configured user permissions for the home and/or device(s).

The systems described herein may use the distributed ambient computing platform to obtain contexts and use such contexts to suggest or automate actions (e.g., computing tasks) for any or multiple of the devices configured for the home. The platform and systems described herein may include or have access to an operating system (O/S) level distributed ambient computing system that accounts for user needs, home/household needs, service needs, and device capabilities. The systems and methods described herein may utilize the platform to execute computing tasks on electronic devices defined as part of the distributed ambient computing system and located within (or associated with) a defined environment. In some implementations, the platform may enable distribution of such computing tasks amongst two or more of the electronic devices within the defined environment. For example, the systems and methods may operate using the platform to access an O/S level architecture associated with one or more devices in the defined environment to detect and communicate with each device in a predefined user environment. Other devices in the defined environment may not have the same O/S level architecture, and as such, the platform may instead utilize inputs and/or outputs associated with such devices in order to execute computing tasks in tandem with other devices in the defined environment that are configured to function with the O/S level architecture.

In operation, the platform executed by the systems and methods described herein can operate as an interface that functions to access a number of unique operating systems (on different devices) and provide UI content, data, audio content, etc., on electronic devices detectable within the defined environment. For example, the platform may allow each device in a predefined environment (e.g., a location representing a home, household, building, etc.) to be configured and defined as a set of inputs, a set of outputs and a set of device capabilities. Each device may include (or have access to) an operating system that may operate with the platform to execute and/or distribute contexts and/or computing tasks across any number of capable devices.

For example, a device with audio sensing capabilities in a living room of the user environment 101 or 102 may determine, privately within the user environment and locally without sharing data outside of the user environment, that there are multiple people in the living room that are speaking. The device (e.g., assistant device 112) may share such signals with the other devices 106, 108, and 110, for example, by generating a home context 116 for device 112. The home context 116 may be stored in distributed repository 114. The home context 116 may be used to trigger modes or policies configured for the environment 101 or 102 (e.g., the home). For example, device 112 may trigger a mode to obfuscate or hide user data based on detecting many people within the home. Such a mode may be a shy mode in which user data is temporarily obfuscated to avoid visitors from viewing such information. For example, the shy mode may trigger photos on ambient displays to be temporarily replaced with art or other generic imagery. In another example, calendar events, notifications, and reminders may be muted, obfuscated, or otherwise redirected to another device, for example, a smart watch of the user. In yet another example, messages and calls may be routed to a mobile devices and/or other wearable devices (e.g., a smart watch) rather than being provided on an assistant device 112, which can provide the advantage of added discretion for the user's data.

Other use cases may include users configuring contextual rules for the home and/or particular devices within the home. For example, the user may configure a no interruption privacy for particular detected activities (or for calendar-scheduled activities). The configuration may be set with permissions for accessing audio, visual, or other sensed data to ensure such data remains with the device and the user environment 101 or 102. An example configuration may include setting a policy for not receiving (e.g., blocking) interruptions while practicing music, eating dinner, etc. Rather than configuring precise rules for the user environment 101 or 102, the system 100 may use the determined home context 116 to allow devices 104-112 to determine if and when the user is performing particular computing tasks and may then trigger automation of execution of the user preferences across available devices according to the home context 116. Any number of home contexts 116 may be determined and stored. For example, the home context 116 may evolve over time as user actions change, user schedules change, device locations change, etc. The home context 116 may be determined as often as the user environment 101 or 102 changes according to user-enabled permissions.

In general, one technical problem that may arise when attempting to share device context amongst devices may include device incompatibilities at the software, hardware, and/or firmware level. For example, the various electronic devices owned and/or accessed by a user throughout a day are generally not configurable to ambiently function together as a distributed ambient computing system (e.g., network). Such devices typically operate using different hard coded operating systems that may not be compatible amongst the devices. This may present a technical challenge in that it may be complicated, time consuming, or improbable for a user to synchronize home devices, in general, and also difficult to synchronize communication, context, and/or policies when new devices are added and/or brought into and out of the home.

The systems and methods described herein provide a technical solution to the technical problem by enabling communication amongst electronic devices and to allow for distribution and sharing of device contexts and user requested computing tasks in order to provide convenient execution of computing tasks requested by users in a household. For example, an underlying O/S executing on one or more of the detected devices associated with a defined environment (e.g., a location area), for example, can be configured to dynamically distribute computing tasks to a capable device within the location area. The distribution of such computing tasks may not occur if, for example, one or more devices are placed in areas of a home that have conflicting activities. For example, if the user requests to play the same music on the household devices, then system systems described herein may assess the context associated with each device to determine whether each respective device context aligns with having music played. The device context may be based upon and/or otherwise pertain to user settings, user permissions, time settings, device capabilities, user location, device location, user environment changes, and the like.

The technical solutions described herein may provide a technical effect of improved task management, improved task assessment, and/or improved decision handling amongst household devices because the context of each device and/or a context of household users are taken into account. The systems and methods may also provide a way to select amongst which devices execute and/or share execution of received computing tasks based on a combined context signal aggregated across each household device. Contexts, computing tasks, and user data may be securely stored and accessed by household devices using a location-implemented distributed repository that is not owned or operated by a service provider nor a manufacturer of the devices at the location.

Furthermore, the systems and methods described herein may use the distributed computing platform to generate and use an identity infrastructure that may enable the defined locations to have digital identities that are unique and separate from a user account of the owner and/or occupants of the structures. For example, the systems may generate a schema of relationships between users and a building, for example, to define a building account (e.g., a household account). The household account may be used to perform digital ownership tracking, track permanent and transient tenancy, provide services for the structure(s) associated with the household account, and administer building access rights, etc., according to user configured permissions. In addition, the digital identity (e.g., the household account) corresponding to a particular structure may be used to manage electronic devices detected within the structure, according to the user permissions.

In some implementations, the sharing of data, contexts, and/or computing tasks may be based on local sharing within a user-controlled and user-defined environment of devices (e.g., the distributed computing platform associated with the structure via the household account). To configure a household account and associated user permissions, the user accesses controls associated with the devices and/or systems described herein to set permissions (e.g., user configured permissions) for sharing content, such as data, tasks, and contexts, amongst user-owned and/or household owned devices. Such permissions may limit or stop the use of the shared content. If permissions allow for such sharing, the sharing is performed securely (e.g., cryptographically secured) within and upon the devices corresponding to the structure via the household account, for example. The content may not be distributed to service providers or other storage elements without explicit user permission.

The systems and methods described herein may use a different paradigm than conventional systems to provide structure-wide policies and preferences via a household account associated with a building, for example. The systems and methods described herein may configure electronic devices to function together as a distributed computing system (e.g., network of devices), rather than operate using conventional device interactions where each device typically operates using different hard coded operating systems that may not be compatible for communicating and sharing tasks amongst devices within the household structure (e.g., building). As a result, there may an increase in communication efficiency between the electronic devices and a reduction in the amount of data transferred based on the knowledge gained by providing information via operating systems of each device in which one or more operating systems of the respective devices may notify other devices of a change, rule, or policy, and the other devices can determine and interpret what the notification of the change, rule, or policy implies for the respective device receiving the notification.

The household accounts described herein may correspond to users that are not in a home environment, but are instead associated with a building or structure, in general. The users that correspond to such a household account may be part of a community, a group, a club, a church, a school, an apartment/rental complex, etc. rather than part of a home representing a family users, for example.

In conventional systems, user devices use and/or are configured with a personal user account. The personal user account may be used to interpret and track data for the device. The systems and methods described herein may instead utilize a household account (i.e., representing an identity of the household structure and devices within the household structure) to enable household devices to interact amongst other devices in the household via a distributed computing system. In addition, the household account may be used for activation, control and management of connected devices within the household. In some implementations, the household account may be used to allow transactions between owners and tenants in a larger building, such as an apartment building. For example, in conventional systems, changing a Wi-Fi password for the building includes resetting the Wi-Fi password to a new password for each and every device in the building (e.g., household).

Because the systems described herein connect building-related elements to a household account, changing a Wi-Fi password may include changing the password on the household account, rather than each device. The changed password on the household account may be applied to each Wi-Fi approved device to update the password without having to manually update each device because the household account may store one or more policies for updating devices associated with the household. Thus, the household account may provide an advantage of managing a large fleet of connected devices (e.g., devices registered to the household account and/or the distributed computing system) and may do so in contexts such as public buildings, apartment complexes, households, etc. with one account that may apply changes for any number of the connected devices, according to user permissions. The household account is configured to provide updates in a secure manner within the household, according to user permissions.

In general, the platform and systems described herein may enable the use of software and/or hardware on one or more of the devices to collect and analyze data, using the user-enabled permissions. The data may remain amongst the devices of the household, for example, for use in enforcing home-wide policies and/or preferences targeted to the home, a room of the home, and/or activities occurring in the home.

The systems and methods herein may solve the technical challenge (e.g., problem) of managing a number of connected household devices by leveraging the distributed computing system to access the household account to configure and maintain devices, access, security, and/or other device signals according to building rules and policies.

The technical solutions described herein may provide a technical effect of improved household management, improved account and device management, and improved device communication amongst household devices because the household account may assess and apply particular policies and rules for devices associated with the distributed computing system, according to user permissions, for example. In addition, user data may be securely stored and accessed by household devices connected via the household account by using a location-implemented distributed repository that is not owned or operated by a service provider nor a manufacturer of the devices at the location.

FIG. 1A is a block diagram illustrating an example contextually aware distributed ambient computing system 100, in accordance with implementations described herein. In the example system 100, a user (not shown) may be in a home (e.g., household location) that includes (or is associated with) any number of devices within the home. The home may represent a user environment 101 (e.g., location/location area) which may be configured as a distributed ambient computing system 100 for the devices associated with a home.

The user environment 101 may be defined by a user to include the home and particular areas surrounding the home. In some implementations, devices within the home can be configured to set the boundary of the user environment 101 according to user request, threshold settings, and/or distance from device policies implemented by a manufacturer and configurable by the user. In some implementations, the user environment 101 is configured to be set with particular user permissions for accessing and/or sharing data within the distributed ambient computing system 100.

As shown in FIG. 1A, the devices of user environment 101 include a number of ambient devices including a door lock device 104, a lightbulb device 106, a tablet device 108, a thermostat device 110, and an assistant device 112. Each of the devices may provide information to the distributed ambient computing system 100 about device state, device context. The devices 104-112 may be part of a network of devices for user environment 101 (e.g., a household). The connection between devices may be wireless, as described in detail below. In some implementations, devices may share device data and device contexts via a distributed repository 114 and/or directly from device to device, but may generally do so according to configured user permissions.

Each ambient device 104-112 may be user-configured according to user-enabled permissions. For example, devices with cameras, microphones, Internet access, and/or other sensor-based ability may be configured according to the user-preferred permissions. Such permissions may be time-based and user-controlled. In some implementations, user devices may be configured to prompt the user to review or edit permissions given to the device to ensure that the user is able to quickly modify permissions and device abilities.

The depicted door lock device 104 may include at least a sensing capability to lock and unlock a door from a received signal. The depicted thermostat device 110 may determine whether or not users are home and may include sensors that user or detect infrared signals, ultrasonic signals, microwave signals, and/or other signal sensor to detect presence of users within a defined environment. Detected user presence may be a trigger to modify the temperature of environment 101, for example.

The assistant device 112 may be a smart display that includes any number of audio sensors, speakers, microphones, Internet (or other network) access, etc. As used herein, a "smart" device may represent an electronic device which may be communicably coupled with other electronic devices, networks, systems via particular wired or wireless protocols including, but not limited to Bluetooth, Zigbee, NFC, Wi-Fi, LiFi, Wireless USB, wireless Ethernet, cellular, etc.

The device 112 may function as an assistant device to carry out user-requested computing tasks including, but not limited to, searches, drafting documents, obtaining and playing audio and/or visual content, configuring other home devices, placing phone calls, asking for a device status, asking for a household status, just to name a few examples. The device 112 may include any number of audio sensors, speakers, microphones, Internet (or other network) access, etc. The sensors associated with each device may function and/or operate according to preconfigured user permissions set for the device and/or for the user environment 101.

The ambient devices 104-112 may include devices associated with a location of the user environment 101. Such devices may or may not include additional devices such as one or more of a mobile phone, a tablet, a computer, or a laptop, for example. For example, one or more user-owned devices may be part of the distributed ambient computing system 100 if the user configures such devices to interconnect others of the ambient devices 104-112 (or other similar devices available in the user environment 101).

In operation of system 100 in environment 101, a user associated with the home may wish to perform computing tasks that involve one or more of the devices shown in FIG. 1A. For example, the user may utter a computing task to be performed. Contexts may be determined for the devices. For example, a context may be generated for a household device 103 and for a household device 105. In some implementations, the contexts may represent combined device contexts that may be further used to generate other contexts for the home. For example, each determined context (e.g., of device 103 and device 105, etc.) may be assessed and combined into a home context 116 (e.g., a combined context of two or more device contexts) in which the distributed ambient computing system 100 may distribute to any number local devices within the user environment 101 (e.g., the home). The distributed ambient computing system 100 may also store device contexts and the home contexts, as shown in distributed repository 114. In addition, the distributed ambient computing system 100 may also store device stats or status, device data, and/or user contexts. Distributing of such data within the home is permitted according to user-configured permissions and is performed securely via blockchains, for example.

The devices (e.g., electronic devices and/or computing devices) described herein may include, but are not limited to smart displays, televisions, mobile devices, tablets, computers, game controllers, lights, alarm clocks, electronic assistants, smart watches, smart phones, thermostats, appliances, fans, switches, sprinklers, air fresheners, blinds, awnings, shutters, curtains, windows, garage door openers, showers, security systems, electronic doorbells, cameras and devices having cameras, electronic locks, smoke detectors, proximity sensors, Internet connected speakers, laptops, desktops, workstations, cars, or other device which may communicate information.

Figure 1B:
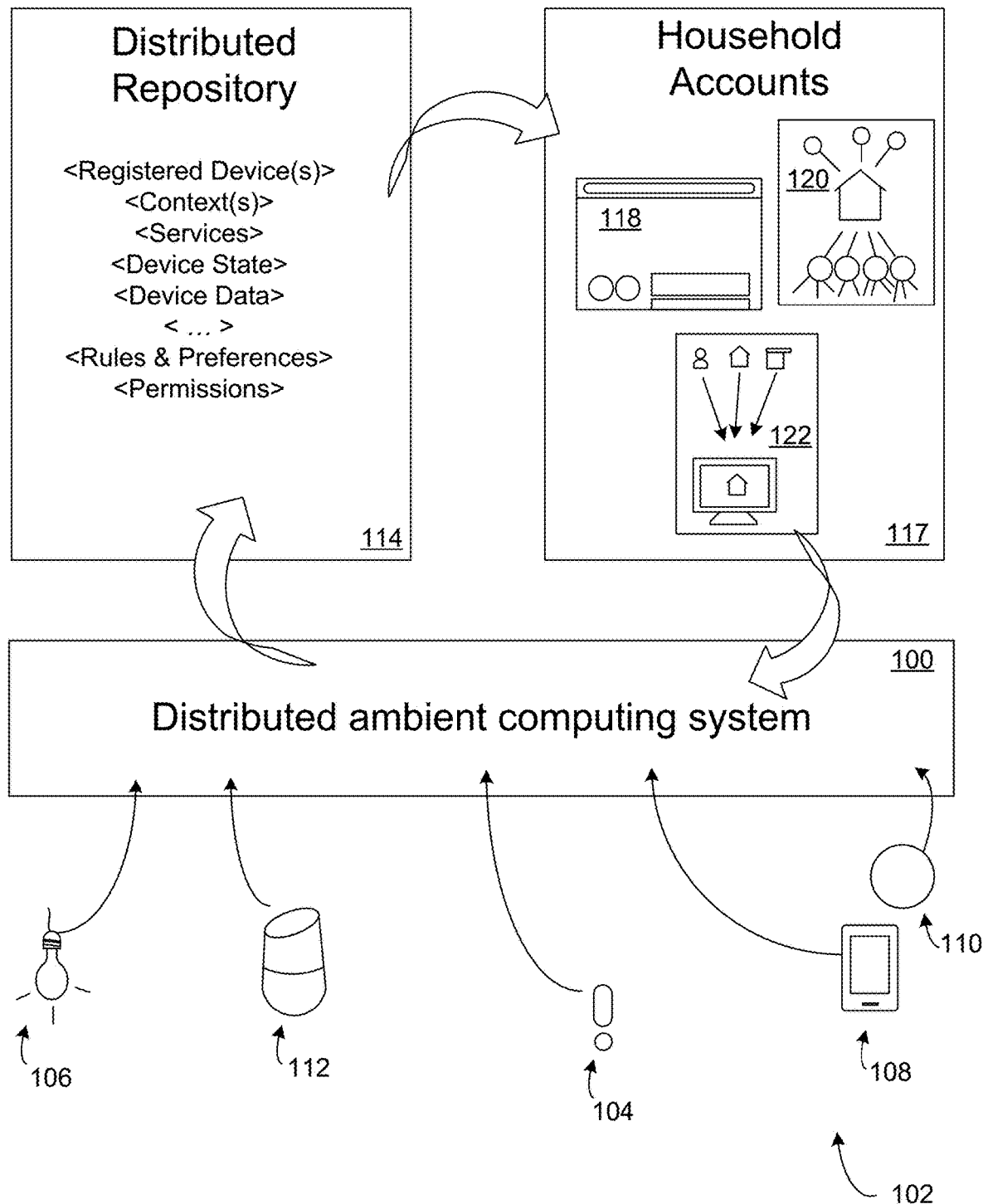

FIG. 1B is a block diagram illustrating an example distributed computing system 100 used for household accounts, in accordance with implementations described herein. In the example system 100, a user (not shown) may be in a home (e.g., household location) that includes (or is associated with) any number of devices within the home. The home (e.g., household) may represent a user environment 102, which may be configured as the distributed computing system 100 for the devices associated with a home (e.g., household).

The user environment 102 may be defined by a user to include the home and particular areas surrounding the home. In some implementations, a household account may define the particular areas surrounding the home. In some implementations, devices within the home can be configured to set the boundary of the user environment 102 according to user request, threshold settings, and/or distance from device policies implemented by a manufacturer and configurable by the user. In some implementations, the user environment 102 is configured to be set with particular user permissions for accessing and/or sharing data within the distributed computing system 100.

As shown in FIG. 1B, the devices of user environment 102 include a number of ambient devices including a door lock device 104, a lightbulb device 106, a tablet device 108, a thermostat device 110, and an assistant device 112. Each of the devices may provide information to the distributed computing system 100 about device state, device context, and/or device usage, according to user configured permissions. The devices 104-112 may be part of a network of devices for user environment 102 (e.g., a household). The connection between devices may be wireless, as described in detail below. In some implementations, devices may share device data and device contexts via a distributed repository 114 and/or directly from device to device, but may generally do so according to configured user permissions.

Each ambient device 104-112 may be user-configured according to user-enabled permissions. For example, devices with cameras, microphones, Internet access, and/or other sensor-based ability may be configured according to the user-preferred permissions. Such permissions may be time-based and user-controlled. In some implementations, user devices may be configured to prompt the user to review or edit permissions given to the device to ensure that the user is able to quickly modify permissions and device abilities.

The depicted door lock device 104 may include at least a sensing capability to lock and unlock a door from a received signal. The depicted thermostat device 110 may determine whether or not users are home and may include sensors that user or detect infrared signals, ultrasonic signals, microwave signals, and/or other signal sensor to detect presence of users within a defined environment. Detected user presence may be a trigger to modify the temperature of environment 102, for example.

The assistant device 112 may be a smart display that includes any number of audio sensors, speakers, microphones, Internet (or other network) access, etc. As used herein, a "smart" device may represent an electronic device which may be communicably coupled with other electronic devices, networks, systems via particular wired or wireless protocols including, but not limited to Bluetooth, Zigbee, NFC, Wi-Fi, LiFi, Wireless USB, wireless Ethernet, cellular, etc.

The device 112 may function as an assistant device to carry out user-requested computing tasks including, but not limited to, searches, drafting documents, obtaining and playing audio and/or visual content, configuring other household devices, placing phone calls, just to name a few examples. The device 112 may include any number of audio sensors, speakers, microphones, Internet (or other network) access, etc. The sensors associated with each device may function and/or operate according to preconfigured user permissions set for the device and/or for the user environment 102.

The ambient devices 104-112 may include devices associated with a location (and/or household) associated with the user environment 102. Such devices may or may not include additional devices such as one or more of a mobile phone, a tablet, a computer, or a laptop, for example. For example, one or more user-owned devices may be part of the distributed computing system 100 if the user configures such devices to interconnect others of the ambient devices 104-112 (or other similar devices available in the user environment 102).

In operation of system 100 in environment 102, a user associated with the home (e.g., household) may wish to configure devices for storage in a distributed repository 114 such that the devices may be used with a household account 117 associated with the distributed computing system 100 for the household structure. The user may first configure a household account 117, as shown by configuration user interface 118. The household account 117 may streamline the addition of family members, devices, and services, for example.

A household account, as used herein may provide an account architecture that may be used for particular buildings, homes, office buildings, multi-unit buildings, complexes, multi-unit homes, schools, churches, stores, rental properties, or other physical structure associated with users entering or exiting such a structure. The household account may be used to provide services to any number of users that may enter or exit the structures described herein. The household account may be configured according to user permissions with respect to account usage, data usage, device usage, and/or retrieving and storing of user associated data.

In conventional systems, user devices use and/or are configured with a personal user account. The personal user account may be used to interpret and track data for the device. The systems and methods described herein may instead utilize a household account (i.e., representing an identity of the household structure and devices within the household structure) to enable household devices to interact amongst other devices in the household via a distributed computing system. In addition, the household account may be used for activation, control and management of connected devices within the household. In some implementations, the household account may be used to allow transactions between owners and tenants in a larger building, such as an apartment building. For example, in conventional systems, changing a Wi-Fi password for the building includes resetting the Wi-Fi password to a new password for each and every device in the building (e.g., household).

Upon configuring the household account 117, the user may use the account 117 to share services with associated household groups (e.g., groups of users associated with the household structure), as shown by block 120. Users can share services in order to share expenses, calendars, and accounts even without registering a particular device. The users may then pre-provision devices and define room-specific settings for devices to adopt, as shown by block 122.

The distributed repository 114 may include registered device data, context data, service data, device state data, device data, rules and preferences data, and permissions data. The distributed repository 114 may be shared amongst other devices and/or network-based logging including, but not limited to blockchain, transparent ledgers (e.g., logs), or other sharable storage scheme. The data stored in the distributed repository 114 may be reported from each individual device via a shared secure schema. In some implementations, one or more heuristics or software code may be configured to analyze information associated with devices and household accounts associated with the distributed repository 114.

A user environment (e.g., user environment 101, 102, home, household) may include a household defined based on one or more of associated users, rooms, square footage, recognized and/or configured devices, and/or other elements associated with a household. In some implementations, the defined environment 102 may include a building, a user-defined perimeter, a yard surrounding a home, an apartment, a condominium, a set of buildings, or a room, just to name a few examples.

The devices (e.g., electronic devices and/or computing devices) described herein may include, but are not limited to smart displays, televisions, mobile devices, tablets, computers, game controllers, lights, alarm clocks, electronic assistants, smart watches, smart phones, thermostats, appliances, fans, switches, sprinklers, air fresheners, blinds, awnings, shutters, curtains, windows, garage door openers, showers, security systems, electronic doorbells, cameras and devices having cameras, electronic locks, smoke detectors, proximity sensors, Internet connected speakers, laptops, desktops, workstations, cars, or other device which may communicate information.

Although a few different device types are shown in FIGS. 1A-1B, any number of computing devices (e.g., ambient devices, personal computing devices, electronic devices, etc.) may be configured to operate using the platforms and distributed ambient computing systems described herein. Because such devices are defined according to inputs, outputs, and device capabilities, the systems and methods described herein may utilize the device capabilities according to computing task requests and policies associated with the environment and/or one or more of the devices.

Figure 2A:
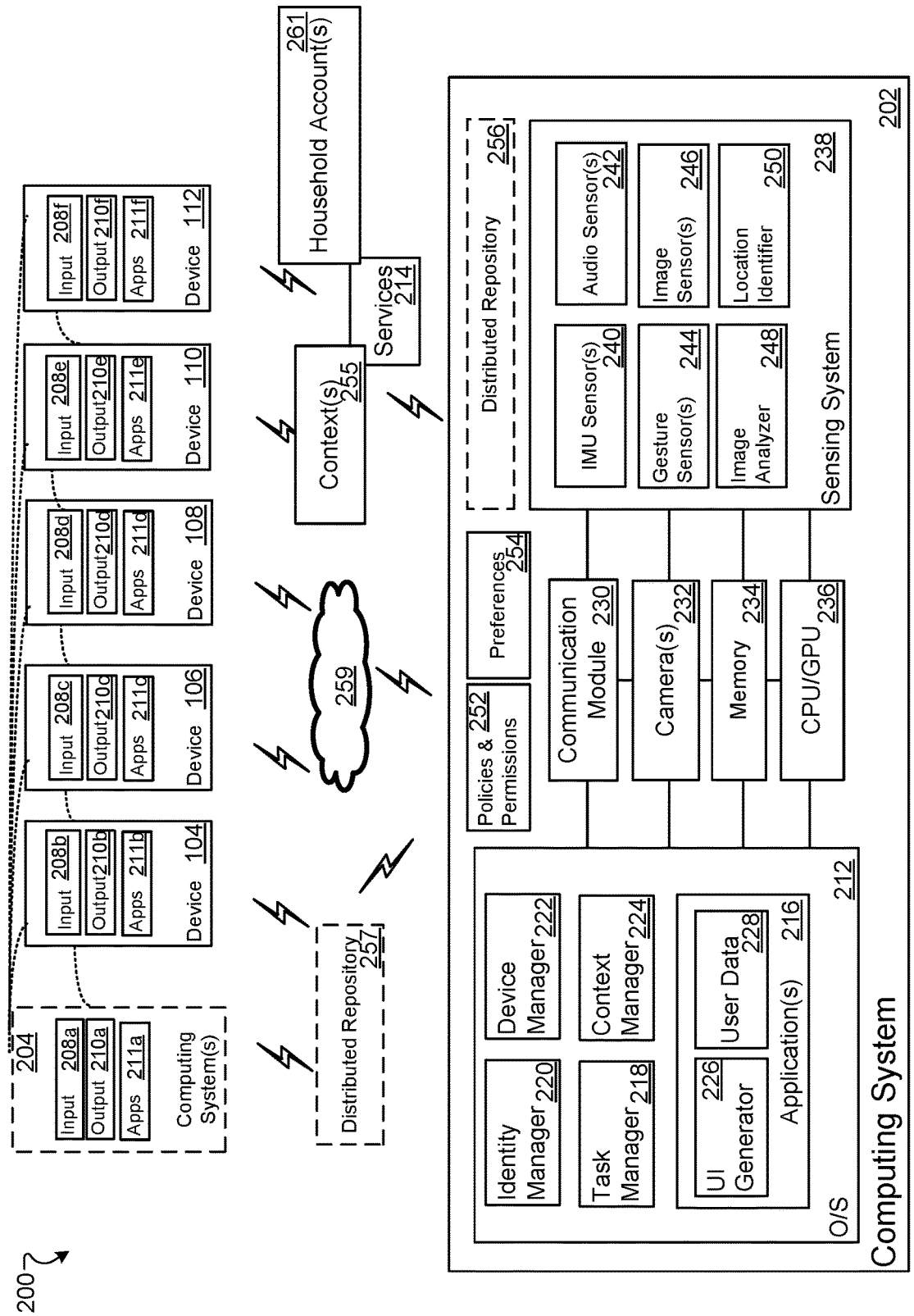
FIGS. 2A-2C are block diagrams that illustrate an example distributed ambient computing system including multiple devices, in accordance with implementations described herein.
Figure 2B:
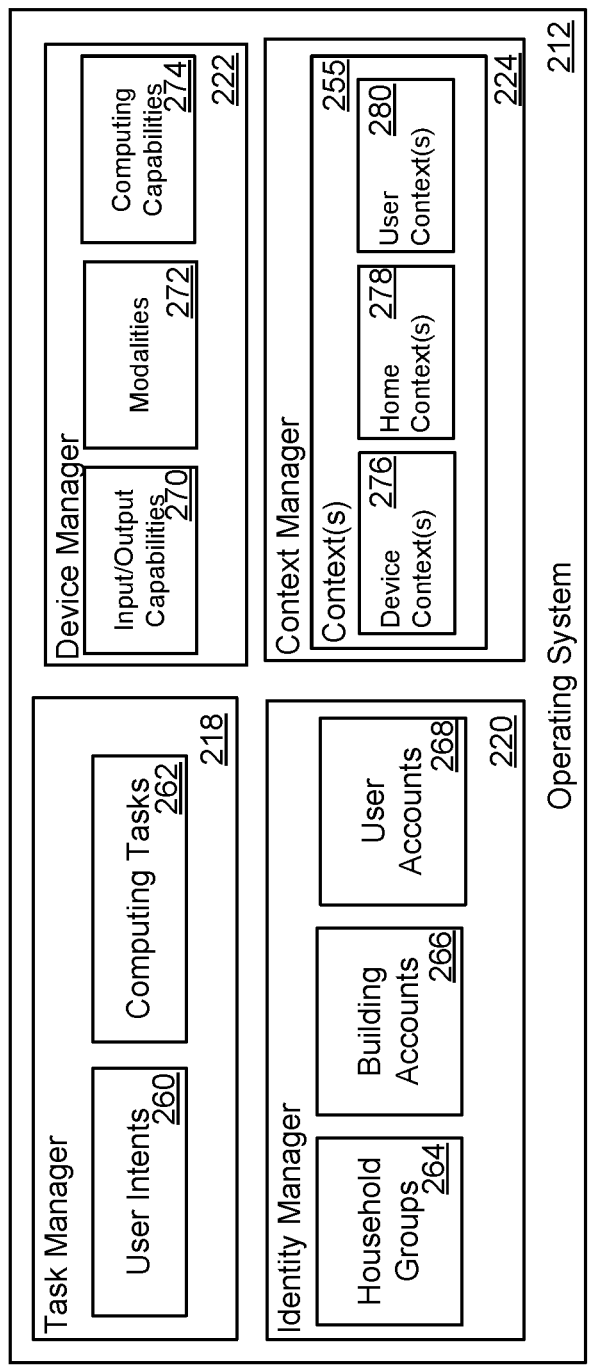
Figure 2C:
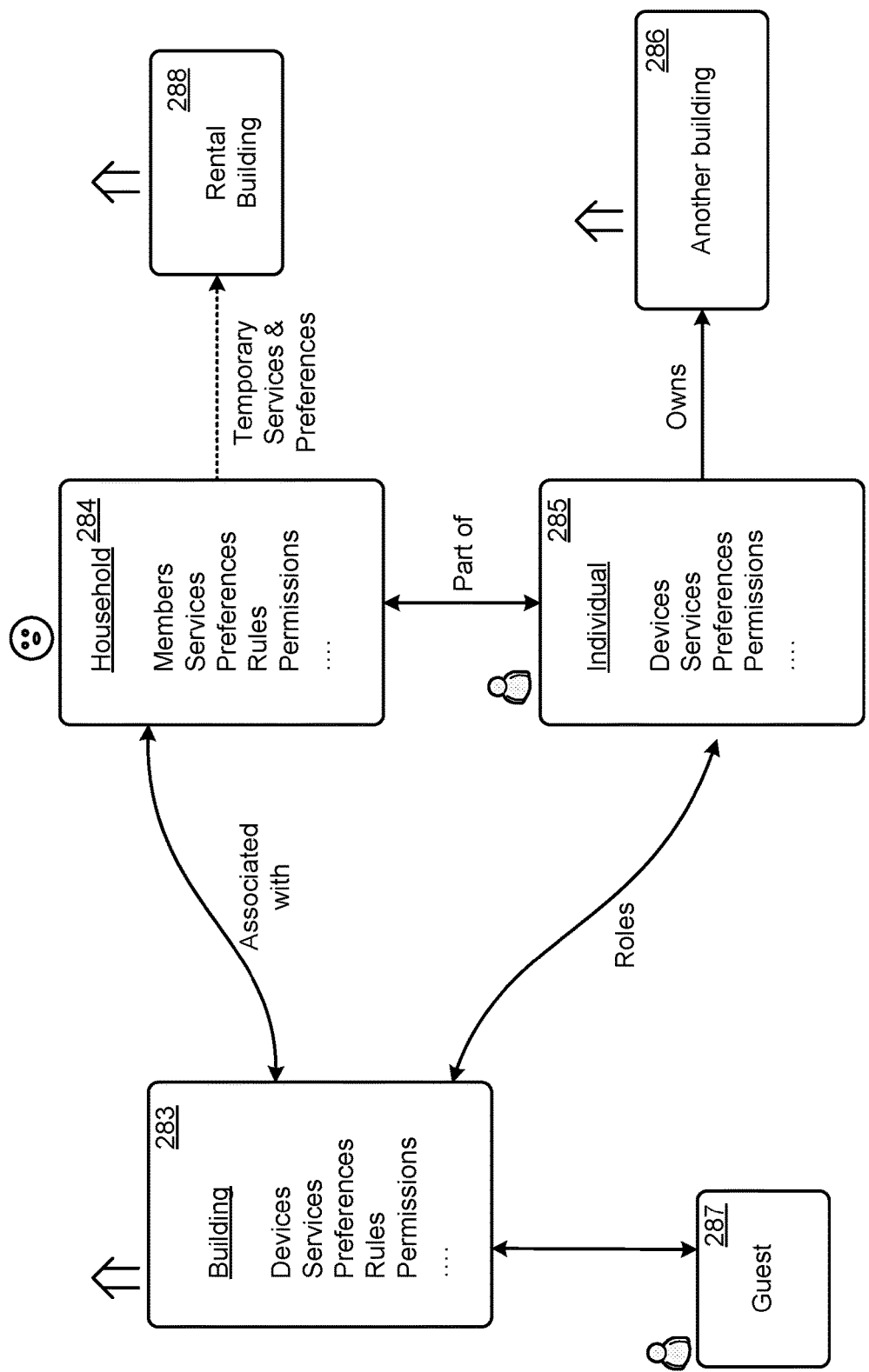

FIGS. 2A-2C are block diagrams that illustrate an example distributed computing system 200 including multiple devices, in accordance with implementations described herein. The system 200 may be used to configure computing devices (e.g., computing system 202 and computing system 204), ambient devices (devices 104, 106, 108, 110, and 112), and/or other devices (not shown in FIG. 2A) to function as a single distributed computing environment, such that device contexts, user contexts, home contexts, device states, and/or requested computing tasks may be dispatched and/or shared amongst any of the devices within the distributed ambient computing system 200. For example, system 200 may be able to recognize and describe each device in each room of a particular environment for purposes of obtaining contextual inputs, controlling device functionality and/or processing, and providing context-based outputs, regardless of the underlying operating system executing on each device.

In some implementations, the multiple devices may include any number of applications that may be formed dynamically from available software components (and functionality) available in the distributed ambient computing system 200, for example. The applications may provide dynamic interoperability that operates on a platform that is operating system independent.

As used herein, a distributed ambient computing system may refer to a network of multiple (e.g., two or more) autonomous computing devices, mobile devices, ambient devices, personal handheld devices, sensors, and the like, that may communicate amongst one another and/or other devices configured for the network. The network may be a predefined network, an autonomously generated network, a peer-to-peer network, or other network that allows data to be transferred between devices in the network using protocols such as UPnP, SLP, or GSM, just to name a few examples. The distributed ambient computing system may provide coordinated use of shared resources, shared accounts (e.g. household accounts 261), contexts, communication infrastructure, UI elements, and/or services to carry out computing tasks and requests received from a user associated with one or more of the devices defined for the distributed ambient computing environment. A distributed ambient computing environment may also refer to a defined physical space that has access to resources, communication infrastructure, UI elements, and/or services available to devices configured in the distributed ambient computing network. In general, the distributed ambient computing systems described herein may be generated and maintained according to user-based permissions configured by a user and maintained by the user.

Each device in a particular distributed ambient computing system (e.g., devices 104, 106, 108, 110, 112, 202, and 204 in the example of FIG. 2A) may be defined by capabilities associated with such devices including, but not limited to respective device capabilities (from onboard device sensors, device outputs, and/or device inputs). The computing system 202 may be configured to dynamically distribute computing tasks across any of devices 104, 106, 108, 110, 112, and 204, for example.

Any number of sensors may be available on the devices described herein. In addition, if a particular sensor is unavailable on one device, another device may provide the sensor to perform (e.g., execute) a capability requested within a user-requested computing task. Example sensors may include, but are not limited to optical sensors, image sensors, audio sensors, motion sensors, proximity sensors, temperature sensors, infrared sensors, ultrasonic sensors, touch sensors, pressure sensors, level sensors, smoke and/or gas sensors, chemical sensors, accelerometers, gyroscopes, environmental sensors, etc.

The input 208a-208f may include, for example, content received via a touch input device that can receive tactile user inputs, a hand controller, a mobile device (or other portable electronic device), a microphone that can receive audible user inputs, and the like. The output 210a-210f may include, for example, generation of content for a display for visual output, a speaker for audio output, and the like.

In some implementations, each device 104, 106, 108, 112, 202, and 204 includes a number of apps (e.g., apps 211a-211f). The apps may utilize services 214, policies and permissions 252, preferences 254, contexts 255, a distributed repository 256, and household accounts 261 (FIG. 2A). The distributed repository 256 may be on computing system 202 (or other device) as a local copy, but may also be updated via a network, an Internet connected network, or other network. Synchronization can occur between the two distributed repository logs, for example, distributed repository 256 and distributed repository 257.

In a non-limiting example, the system 200 may determine inputs, outputs, and capabilities of devices in the system and make a determination as to which device may be used to carry out a computing task, display information, etc. For example, a camera device may include a video input and a microphone input, but may not include output capabilities. Other devices, such as a Wi-Fi router or a smart display, may have similar or different inputs and/or outputs, but may have additional processing power and/or memory, and as such may be selected by system 200 to perform processing for another device in the system 200. In operation, system 200 may dynamically determine which device is suited to fulfill a user requested computing task. For example, the system 200 may assess contexts 255 including, but not limited to device contexts, user contexts, task contexts, device state, and/or device data. The assessment of contexts 255 may include generating the home context 116 based on contexts received from the devices associated with the user environments 101 and/or 102.

In some implementations, contexts 255 may indicate which devices may be selected to carry out user requested tasks. For example, if the system 200 determines that particular assistant devices carry out timer tasks, the system 200 may select such devices for timer task execution based on the indication that the assistant devices within the household, for example, are used for timer tasks. Thus, if a user asks the household devices to set a thirty minute, timer, the system 200 may trigger a timer to be set and executed on a closest assistant device near to the user, rather than setting the timer on a user's mobile phone device, for example. In some implementations, the system 200 may use a different device for executing the timer task based on determining that the assistant device is currently in use or a bandwidth of the device is over a particular threshold. In such an example, the system 200 may instead choose the mobile device to generate and execute the timer task. In another example, the system 200 may search for a next closest assistant or timer capable device in order to generate and execute the timer task.

In some implementations, the computing system 204, and devices 104-112 may include the components shown in computing system 202. In such an example, each computing system and device may be used to assess capabilities, assess contexts, and/or distribute computing tasks amongst devices 104-112. For example, computing system 204 may be an assistant device with image sensors, audio sensors, and Internet connectivity. Computing system 204 may be located in a location within a defined household. The computing system 200 may access any of devices 104, 106, 108, 110, and 112 as well as computing system 202 to perform and/or share computing task execution and/or context analysis.

In general, the computing systems 202 and 204 and devices 104-112 may communicate and/or transfer data wirelessly amongst one another using the systems and platforms described herein. In some implementations, each device may be configured in the distributed ambient computing system 200 to communicate with each device associated with system 200.

As shown in FIG. 2A, the computing system 202 includes an operating system (O/S) 212. The O/S 212 may function to execute and/or control applications, services, and device communications. The O/S 212 may be a first type of operating system while other devices shown in FIG. 2 (or associated with a particular distributed ambient computing system) may be a different operating system operating different device hardware.

In operation, the systems and methods described herein may provide access to one or more services 214 for any number of different device types that may be within a distributed ambient computing system 200 (e.g., in a household), for example, where each device may be executing a different operating system. The services 214 may be configured to generate, manage, and execute computing tasks detected (e.g., received) in the distributed ambient computing system 200. In addition, the services 214 may provide O/S level access to detect peripheral (e.g., ambient) devices and capabilities. The services 214 may be an O/S level executive decider to dispatch computing tasks received in system 200.

The services 214 may include personalized computer-based services provided by a service provider to a user. In some implementations, the services may not be personalized, but may instead be general services offered to users for use on their computing and/or electronic devices. In some implementations, the services may be provided via an app (e.g., application) at the request of the user.

The O/S 212 may execute and or otherwise manage applications 216, a task manager 218, an identity manager 220, a device manager 222, and a context manager 224. The applications may include a user interface (UI) generator 226 and user data 228, both of which may be used to generate content and/or data and provide such content and/or data to the users via a device interface, according to user permissions.

The task manager 218 may manage distribution of computing tasks throughout a distributed ambient computing system 200. For example, the task manager 218 may assess computing tasks and device capabilities in order to trigger completion of the computing tasks using one or more of the devices in the system 200.

The identity manager 220 may manage identities associated with the system 200. For example, a user may be associated with a device using an identity. The identity may be associated with an identity account, but such an account is user controlled and generated, rather than service provider controlled and generated. Each identity may be represented as a globally unique identifier. In addition, each identity may be represented with a persona, which may be used to present the user (or data associated with the user) to third parties or other devices in system 200, for example. In general, the identity manager 220 may be used to add and/or modify users, home services, physical buildings, and devices. For example, the identity manager 220 may generate an account that may represent a physical building (e.g., a home), such as household account 261. The identity of the home may include an address and other identifying data in which a user may claim ownership. The identity of the physical building is typically not directly connected to a human user or a service provider, but instead corresponds to an account set up by the user for the home.

In an example, a user may claim ownership of a particular physical building. In response, the identity manager 220 may generate a connection between the physical building, the location, and one or more users within the household associated with the building. For example, the identity manager 220 may be asked by the user to set up additional users to associate (i.e., relate) with a household corresponding to the physical building. The identity may include such relationships and the system 200 may assign rights, policies, and preferences based on such relationships.

The device manager 222 may manage and assess device status and state within the system 200. In some implementations, the device manager 222 may set up devices for particular environments. For example, one or more setup APIs may be embedded and/or otherwise utilized by a setup application, which may be used by the device manager of any particular device in system 200 to present brand expression aspects (e.g., UI content per device brand) while still assuring interoperability with other ambient computing devices in system 200, regardless of the underlying operating system of the devices.

In some implementations, the device manager 222 may provide, or otherwise enable, device to device setup. For example, smart home devices may communicate via peer-to-peer networks (or other networks via ultrasound or other wireless technology) upon user confirmation via a previously provisioned device identity. Upon confirmation, the previously provisioned device may automatically communicate services, preferences, and/or settings to one or more of the smart home devices, for example. Thus, manual Wi-Fi setup, device setup, or other out of the box setup computing tasks may be rendered unnecessary.

In some implementations, device manager 222 may provide modular out of the box experiences so that particular device functionality can be individually activated and/or re-ordered depending on the device a user previously configured and based on information associated with the previous device configuration. The device manager 222 may then reuse information associated with an initial device setup when a user asks for experiences that involve a new setup.

The context manager 224 may assess the circumstances that form a setting for an event, a statement, or an idea. The context manager 224 may define such a setting in terms of which it can be fully understood and assessed. For example, the context manager 224 may provide context-aware computing amongst devices in the distributed ambient computing system 200 according to user permissions. For example, the context manager 224 may use software and/or hardware to collect and analyze data about device surroundings in order to present relevant, actionable information to a user of the device. The collection and analysis occurs within the location associated with the device unless a user requests to use additional resources outside of the defined location. In some implementations, the context manager 224 may collect signals from individual devices, analyze and combine signals into a home-wide context, and notify services and other parts of the systems (e.g., devices) of changes in the context according to system and/or device permissions.

As shown in FIG. 2A, the O/S 212 may include or have access to services 214, a communication module 230, cameras 232, memory 234, and CPU/GPU 236. The computing system 202 may also include or have access to a sensing system 238. The sensing system 238 includes inertial measurement unit (IMU) sensors 240, audio sensors 242, gesture sensors 244, image sensors 246, image analyzer 248, and location identifier 250. The sensing system 238 may have access to communication module 230, cameras 232, distance/proximity sensors (not shown), positional sensors (not shown), and/or other sensors and/or different combination(s) of sensors. Some of the sensors accessed by system 202 may provide for positional detection of a device associated with the system 200 or a user of the system 200. Some of the sensors of system 238 may provide for the capture of images of a physical environment associated with the distributed amendment computing system for display on a component of one or more of devices 104, 106, 108, 110, 202 and/or 204.

The IMU sensor 240 may function to detect or measure, for the computing system 202, an angular velocity and linear acceleration. The system 202 may then calculate and/or estimate a 3D orientation in 3D space based on the measurements taken by the IMU sensor 240. The IMU sensor 240 may include one or more accelerometers, gyroscopes, magnetometers, and other such sensors. In general, the IMU sensor 240 may detect motion, movement, velocity, and/or acceleration of the computing system 202, for example.

The image sensors 246 may detect changes in background data associated with a camera capture performed by computing system 202 (or another device in communication with computing system 202). The cameras 232 may include a rear-facing capture mode and a front-facing capture mode.

The computing system 202 may generate and/or distribute particular policies and permissions 252 and preferences 254. The policies and permissions 252 and preferences 254 may be configured by the device manufacturer or by the user. Policies and permissions 252 and preferences 254 may include routines (i.e., a set of actions) that trigger based on an audio command, a visual command, a schedule-based command, or other configurable command, as well as user permissions, and each of which may be triggered according to the user permissions. For example, a user may set up an evening routine with preferences and/or actions to trigger devices in a predefined location to lock one or more doors, turn on or off one or more cameras, and turn off lights. A received command may trigger such a routine. Other policies and preferences may of course be configured to modify and or control other devices associated with a particular location configured with the policies and permissions 252 and/or preferences 254.

In some implementations, the computing system 202 may access the distributed repository 256 (and/or distributed repository 257) to maintain device statuses and task statuses during operation of the distributed ambient computing system 200. Such distributed repository 256 (and/or distributed repository 257) may represent a distributed repository system. In some implementations, the distributed repository 256 (and/or distributed repository 257) may be provided as a service 214. Such a service may be synchronized across the devices owned by a particular household, building, user, etc. In some implementations, the distributed repository 256 (and/or distributed repository 257) may be provided via an application.

Each application 216 and/or component executing on behalf of a particular defined user may have a separate data store provided and managed by the distributed repository (e.g., log) 256, for example, and provided to other user associated devices, as requested by the user. The data store for the particular component/user combination is private to the user and thus not accessible to other applications of the same user, and not accessible to other users of the same application (or another application). Each data store may be transparently synchronized across devices associated with a user through a network provider (e.g., network 259, for example. Any data operations may be executed offline-first with no coordination with the network. If concurrent modifications result in a data conflict, the conflict can be resolved using an app-configurable merge policy, for example.

Each data store may be organized into collections exposing a key-value store Application Programming Interface (API) (e.g., pages). The API may support storing data of arbitrary size, atomic changes across multiple keys, snapshots and modification observers.

In some implementations, the distributed repository 256 (and/or distributed repository 257) implementation includes storage (not shown) that stores and provides access to the data locally, client components that interact with storage, and a local client that exposes the distributed repository 256 API to locally running applications (e.g., applications 216).

In general, the contents of each commit within the commit history include key-value pairs (entries), stored in a B-Tree-like structure that includes entries that are ordered by the keys permitting efficient evaluation of range queries, tree nodes that are immutable, allowing referencing the same node from two (or more) different commits and thus avoiding duplicating the state among different commits with similar content, and the B-Tree is history-independent, (i.e. given the same set of entries, the resulting structure of the tree will be the same, independently of the insertion order). This property permits to efficiently compute the difference between two given commits.

In operation, the distributed repository 256 may operate locally for the application 216 and may not synchronize data with the network 259 and distributed repository 257 if the application is operating in guest mode. If the application 216 is operating in standard mode, the distributed repository 256 may automatically synchronize user data using a network instance via network 259. In general, the network 259 may provide hybrid network services or public network services. Hybrid network services may be generated, provided, and/or serviced by a hybrid network solution vendor. Public network services may be owned and operated by a network service provider that manages public networks.

The distributed repository 256 may provide for carrying out transactions that allow an application (e.g., application 216) to make a set of changes that may be synced and surfaced to any number of devices within distributed ambient computing network 200. For example, the computing system 202 (e.g., a client device) may start a transaction, obtain a snapshot of the page state, and read the data. The computing system 202 (via application 216, for example) may then make changes through a page interface of the distributed repository 256, and may commit the transaction to the repository 256 (and/or repository 257). Once a transaction is started, the state of the page is tracked and pinned so as to not advance until the transaction is either committed or aborted. This may provide an advantage of ensuring that the transaction writes affect precisely the state visible on a snapshot of the page. In some implementations, the distributed repository 257 may operate as a master household distributed repository in which the configured household devices may share (and synchronize) data to/from respective distributed device storage, such as distributed repository 256.

Each device within a particular distributed ambient computing system may include one or more processors (e.g., CPU/GPU 236) in communication with the O/S 212, the sensing system 238, the communication module 230, services 214, memory 234, and/or cameras 232. The communication module 230 may provide for communication between the computing system 202 and other external devices. Processors (CPU/GPU 236) are configured to execute instructions (e.g., computer programs) in order to carry out specific tasks. In some implementations, at least one of the processors (CPU/GPU 236) executes instructions to operate devices in a distributed ambient computing system. Memory 234 may be utilized throughout communications and interactions amongst the elements in system 200.

In addition, the computing system 202 may use or have access to one or more peripherals (not shown). Example peripherals may include any number of controllers, computing devices, head-mounted display devices, cameras, speakers, tracking systems, and/or other device in communication with computing system 202.

In some implementations, the computing system 202 includes or has access to a tracking system (not shown). The tracking system may include (or have access to), for example, light sensors, inertial measurement unit (IMU) sensors 240, audio sensors 242, image sensors 246, image analyzer 248, location identifier 250, cameras 232, distance/proximity sensors (not shown), positional sensors (not shown), and/or other sensors and/or different combination(s) of sensors.

Various solutions to the problems noted above are provided by a computing system, in accordance with implementations described herein. A computing system, in accordance with implementations described herein, may leverage data collected by various sensors and/or devices included in the distributed ambient computing system(s) to generate (e.g., build) networks of devices that function with services and a platform to detect, identify, and/or rank devices available and capable in a home environment. Such a service may make decisions (e.g., automatic or user-requested) to dispatch and/or orchestrate tasks across the available devices in the distributed ambient computing system(s). Additional details regarding the services and platform are described below.

Referring to FIG. 2B, the task manager 218, the identity manager 220, the device manager 222, and the context manager 224 are depicted. The task manager 218 includes user intents 260 and computing tasks 262. The user intents 260 may represent something that a user wants when the user requests a computing task 262 (e.g., a task) of a device. For example, the user intent 260 may be a purpose that the user wishes to carry out. The task manager 218 may utilize user intent in combination with determined contexts 255 in order to carry out one or more computing tasks 262 requested by the user.

The identity manager 220 includes household groups 264, building accounts 266, and user accounts 268. The household groups 264 may include definitions for particular groups of users or devices associated with a defined location (e.g., a home, building, etc.). The building accounts 266 may include information about which accounts are associated with a particular location (e.g., or building). In some implementations, the building accounts 266 may represent household accounts 261. In some implementations, the building accounts 266 may define relationships of the users to the building, digital services associated with the building, occupants and/or devices associated with the building, services associated with the building, spatial layouts of the building, location of the building, policies associated with the building, and/or emergency access information for the building. In some implementations, the building account 266 can include household data for maintenance and device management, for example. In some implementations, such a building account 266 may be used to track tasks completed including, but not limited to building maintenance, user entry and exit from the building, according to configured user permissions.

The device manager 222 includes input/output capabilities 270, modalities 272, and computing capabilities 274. The context manager 224 includes contexts 255 which include device contexts 276, home contexts 278, and user contexts 280. In some implementations, the contexts 255 may include or have access to task contexts, and/or device states. The contexts 255, in general, represent relationships amongst entities (e.g., users, devices, information) within a user environment. The contexts 255 may be used to dynamically provide useful information to a user on one or more devices. For example, the contexts 255 may be used to provide a summary of a user or device and what may matter to the user or device while providing inherent user control over the user experience provided by the devices. In some implementations, the system 200 may utilize contexts 255 and user permissions to summarize people known to a device user, calendar events of the device user, preferences and interests of the device user, devices owned by the device user, locations visited, and/or other user entered information corresponding to the device user. Such contexts 255 may be protected within a user environment and may not be utilized outside such an environment without explicit user permission to do so. In some implementations, the contexts 255 may be used to complete tasks requested by the user. In some implementations, the contexts 255 may be used to assess which device(s) will complete the tasks requested by the user.

Referring to FIG. 2C, a schema 282 is shown including a number of entities. The entities include at least buildings block 283, households block 284, and individuals block 285. In some implementations, additional buildings block 286, guests block 287, and other buildings such as rental buildings block 288 may also be represented in schema 282.

The buildings block 283 may represent identities for devices, services, preferences, rules, and permissions for buildings defined with respect to a household account configured for distributed computing system 200, for example. The buildings block may define such elements available for configuration with devices that are associated with the buildings represented in the distributed computing system 200.

The households block 284 may represent identifies for members, services, preferences, rules, and permissions for households defined with respect to the household account configured for distributed computing system 200, for example. The households block 284 may define such elements available for configuration with household devices that are associated with the households represented in the distributed computing system 200. In general, buildings represented in buildings block 283 may be associated with households in households block 284.

The individuals block 285 may represent identities for specific users associated with the household account configured for distributed computing system 200, for example The individuals block may include devices, services, preferences, and permissions. The individuals block 285 may define such elements available for configuration with devices that are associated with the individuals represented in the distributed computing system 200. In general, individuals represented in individuals block 285 may play a role with respect to a particular building associated with buildings block 283.

The additional buildings block 286 may represent identities for other buildings that may be owned by individuals represented by individuals block 285. The guests block 287 may represent identities for guests that may access a building in the buildings block 283. The rental buildings block 288 may represent particular temporary services and preferences associated with households block 284.

The schema 282 can ensure decoupling of individual identities, household identities, and building identities via a schema that may generate more flexible connections between them. For example, an individual can have their own devices, services and preferences.

An individual can be part of a household and thus decide to share some of their devices and services without losing control over them. Multiple individuals can be connected to a building with different roles including, but not limited to owners, renters, guests, and administrators. In addition, each role may be defined in how each respective role may access and control devices, services, preferences and rules associated with the system 200 and/or household, building, etc.

In some implementations, the system 200 may configure a household (e.g., apartment, office space, home, etc.) for a guest using the household account 261. For example, the system 200 may configure the household account 261 to allow one or more connected devices in the home to control the level of access and/or customization guests or temporary tenants can have (e.g. a guest can disable microphones and cameras). In another example, the system 200 may use the household account 261 to configure devices to play music but may restrict the volume level after a particular time of day to avoid disturbing other guests. In another example, if the guest provides permission for camera and microphone use in the home, the system 200 may use the household account 261 to configure the guest access to the security camera recording of the time that the guests were in the home, but may restrict guest access of any other recorded history associated with the home.

In yet another example, the household account 261 may be used for apartment complex buildings. In particular, a builder can install and set up hundreds of connected devices for the building and may set the devices up without using user-based accounts or dummy accounts. Instead, the builder may configure the household account 261 to administrate services, device access, rules, preference, permissions, etc. When apartments are sold or rented to tenants, the units' digital identities (defined by the household account 261) may be connected to the new tenants. The new tenants may then personalize the device behaviors. When a manager is hired for the building, the manager may be granted administrator access to the devices in the common areas and to the devices in the rented unit, according to tenant-configured (e.g., user-configured) permissions.

Figure 3:
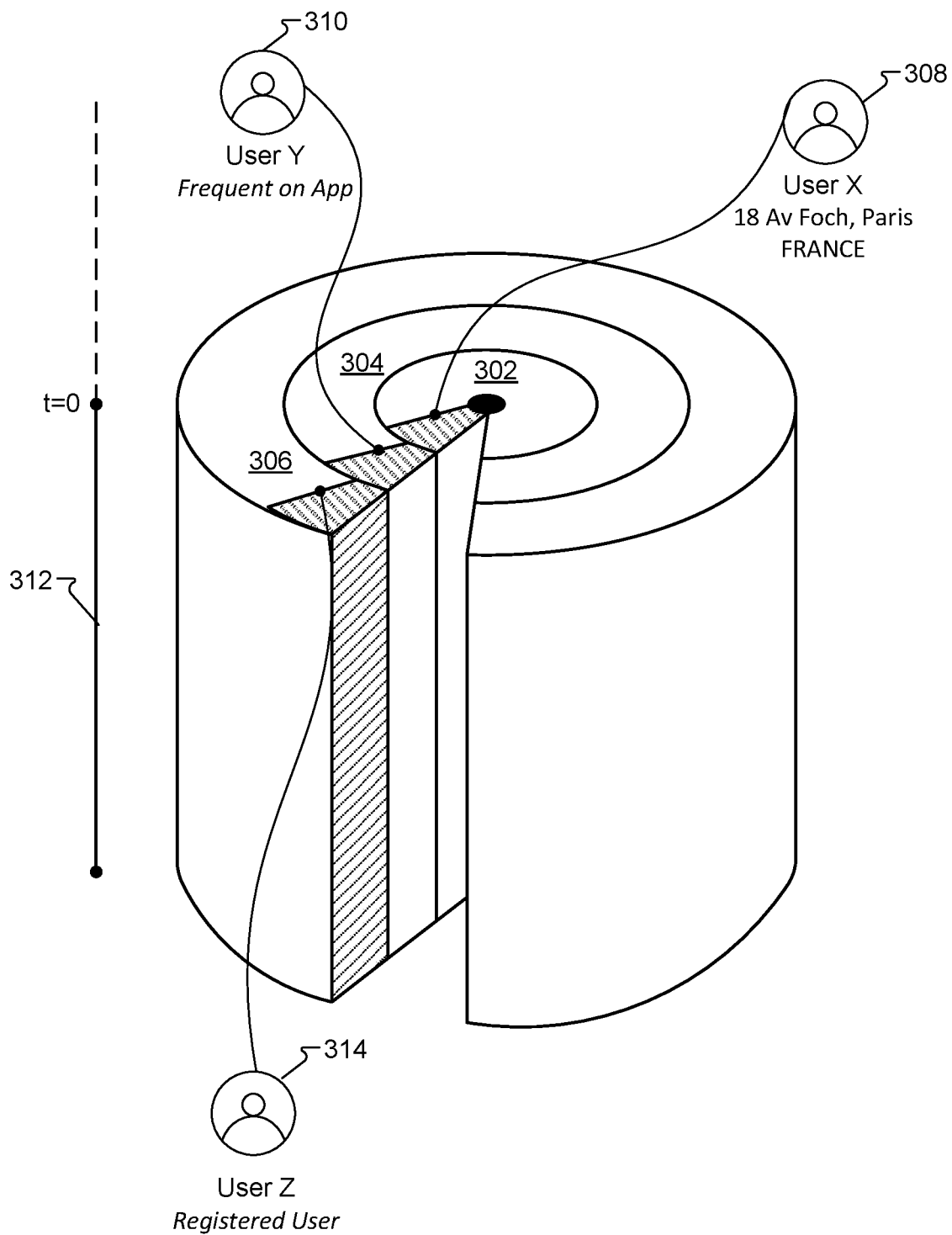
FIG. 3 is a block diagram illustrating an example of layers of contexts represented in a distributed ambient computing system, in accordance with implementations described herein.

FIG. 3 is a block diagram illustrating an example of layers of contexts represented in a distributed ambient computing system, in accordance with implementations described herein. The layers of contexts may represent a time varied level of context for elements in the user environment 101, for example. In some implementations, the layers of context may vary from aspects that are determined important to a user to aspects that are determined less important to the user. Each layer of context may be associated with a minimum and a maximum time threshold. The layers of contexts may be used as a tool to assess tasks carried out by devices in a household and to predict how such tasks may pertain to users, locations, and objects within the user environment. Such information can be used to ensure users are provided with useful data from the devices in the user environment.

As shown, the layers of context may include a core context layer 302, which represents elements (e.g., places, objects, devices, users, and related data) that are often used, contacted, or otherwise interacted with over a recent time period. The core context layer 302 may represent aspects of a user's environment that are meaningful to the user or at least often accessed and/or interacted with including, but not limited to interactions with close contacts (e.g., user X), family members, routinely visited home and office buildings, etc.

The layers of context may also include a close context layer 304. The close context layer 304 may represent a relation of proximity the user may have with tasks, places, objects, and other users. The proximity may refer to a physical proximity (e.g., things near the user versus things far away from the user). The proximity may refer to a relational and/or social proximity (e.g., a family member 310 versus a stranger). The proximity may refer to a time proximity (e.g., time 312) measured in minutes, hours, days, months, years, etc. In general, the close context layer 304 may represent a context that is stable and less likely to rapidly change over time.

The layers of context may additionally include a broad context layer 306. The broad context layer may represent a low level of engagement with any number of places, objects, users, and tasks. The broad context layer 306 may identify user states according to configured user permissions. For example, a device context may be determined as broad according to a particular state of the user. If the user is seated and watching a movie, indicators and/or reminders regarding events that occur tomorrow may be held until a determined convenient time for the user (e.g., after the movie). The broad context layer 306 may represent a level of engagement that is volatile over time often changing over time.

Figure 4:
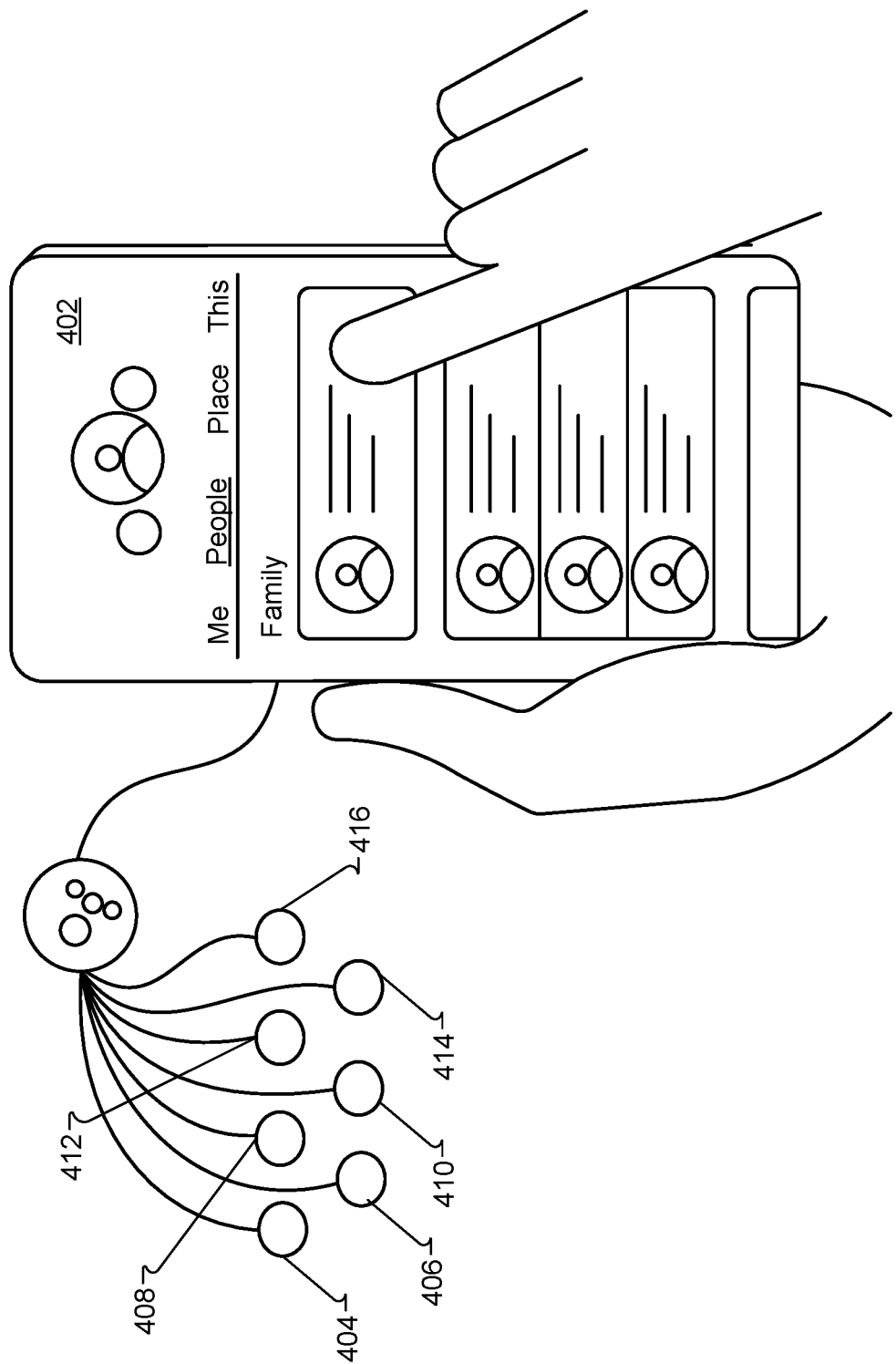
FIG. 4 is an example diagram illustrating example context schemas used in a distributed ambient computing system, in accordance with implementations described herein.

FIG. 4 is an example diagram illustrating example context schemas used in a distributed ambient computing system, in accordance with implementations described herein. In this example, a user is accessing content on a mobile device 402. The device 402 uses the distributed ambient computing system described herein to take into account the layers of context such that services, users, tasks, reminders, etc. can be updated across device 404, device 406, device 408, device 410, device 412, device 414, device 416, etc. according to the contexts for the devices. The devices 404-416 may be associated with distributed ambient computing system 100, for example, such that contexts may be shared across devices according to user permissions.

Figure 5A:
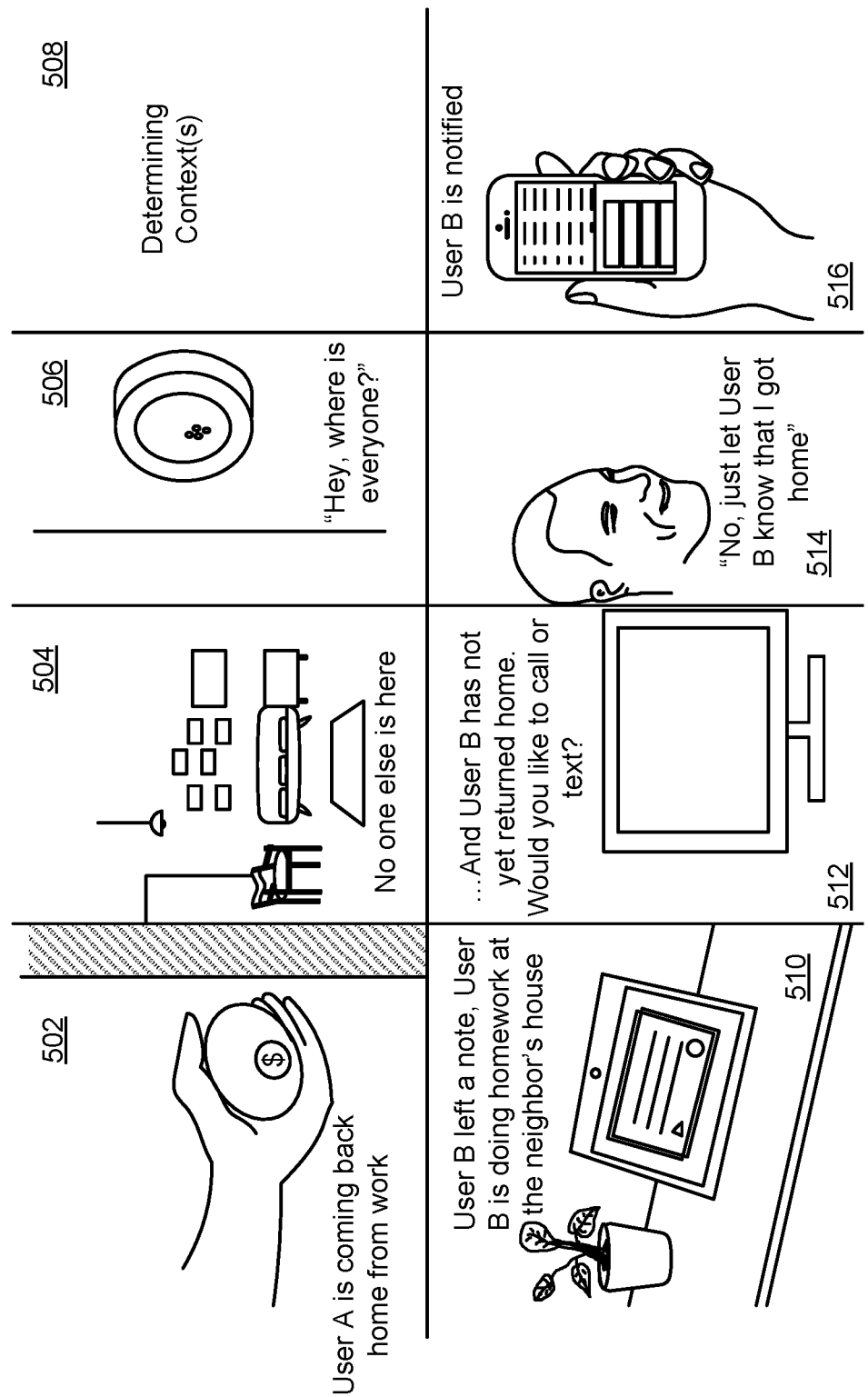

FIGS. 5A-5G are block diagrams illustrating example use of context to generate information for a user operating one or more devices within a distributed ambient computing system, in accordance with implementations described herein. Referring to FIG. 5A, a user A may be arriving at home from the office, as shown in block 502. The user may notice that no one else is home, as shown in block 504. The user may ask a device in the home where everyone is, as shown in block 506. One or more devices associated with the home may receive the user uttered task and may determine a context of the home, as shown by block 508.

Upon determining the contexts, at least one device in the home performs the task, as shown by block 510. For example, the device responds that "User B left a note, user B is doing homework at the neighbor's house." At a later point in time, the device recognizes (according to determined contexts from block 508 or updated contexts determined based on devices in the home) that User B is not yet home. Thus, the device notifies User A that "User B has not yet returned home and inquires whether or not user A would like to call or text User B from the device, as shown in block 512. The user A may respond, as shown in block 514. Here, User B indicates that he does not wish to call or text user B by uttering "No, just let User B know that I got home" and in response, the device notifies user B, which is received at a mobile device of User B, as shown at block 516. In this example, the device determines contexts for User A, User B, and any number of devices. In addition, at least one of the device may infer that the "I" used in block 514 equates to user A.

Figure 5B:
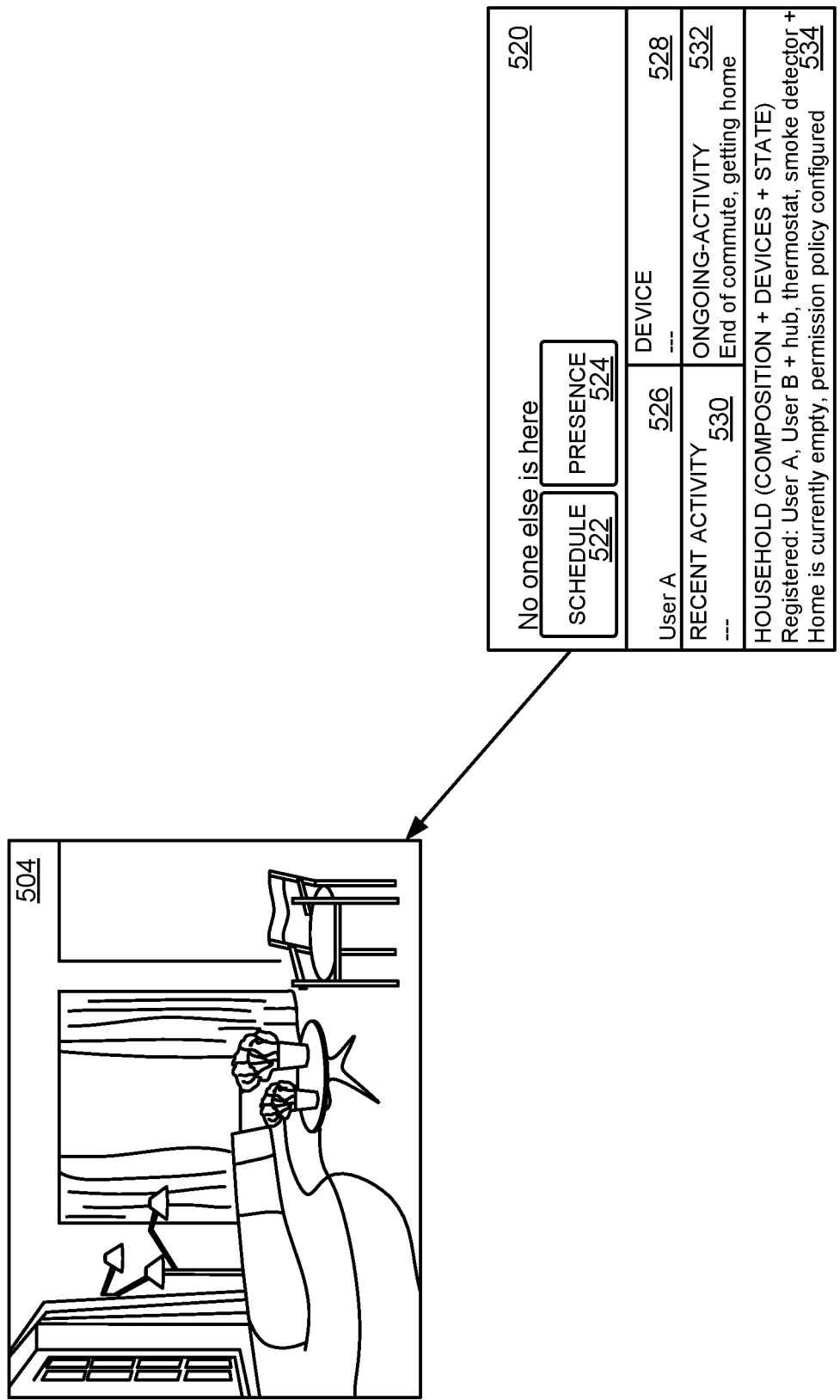

Referring to FIG. 5B, the block 504 represents User A returning home to find that no one else is home. The system 200, for example, has generated a context 520 for the home. The context 520 is based on a known user schedule scheme 522 and a detected and/or known user presence scheme 524, both of which may be provided according to user permissions. The context 520 is associated with User A, as shown by block 526, but is not yet based on devices in the home, as indicated by no devices shown in block 528. The recent activity has not been tracked or displayed because User A was not in the home and as such, block 530 depicts no known user activity. In some implementations, recent activity may include a task or activity that User A performed before leaving the home earlier the same day, for example.

An ongoing activity block 532 depicts that User A is at the end of a commute and just getting home, according to detected user presence 524, calendar entries, known user schedules 522, and the like. The context 520 may be based on a household composition, known devices, and state of the household, as shown by block 534. In this example, the distributed ambient computing system 200 may retrieve information that User A and User B are both registered for the household. In addition, system 200 may retrieve information about which devices are registered and/or otherwise configured for the household. In this example, a hub, a thermostat, and a smoke detector are configured for the household. In addition, the system 200 may detect, according to user permissions, that the home (e.g., household) is currently empty and that a permission policy is configured.

In some implementations, the task of monitoring and using context 520 to dispatch tasks can be done at the OS-level that encompasses all devices in a defined environment, or a specific device in the environment. For example, a particular device may be a master device (e.g., a master assistant device) while other devices function from commands received via the master device. In some implementations, the OS-level management may enable devices with a specific operating system to manage other devices with a different operating system.

Figure 5C:
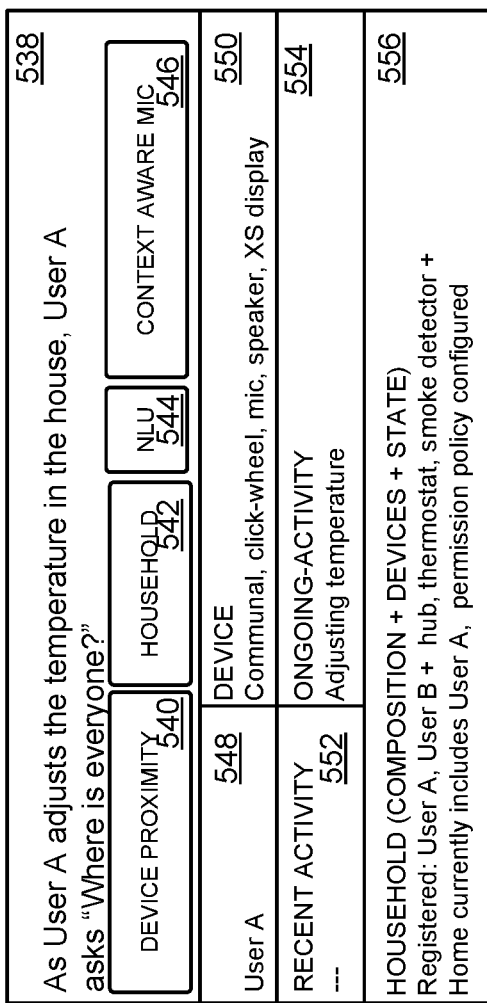
Figure 5C:
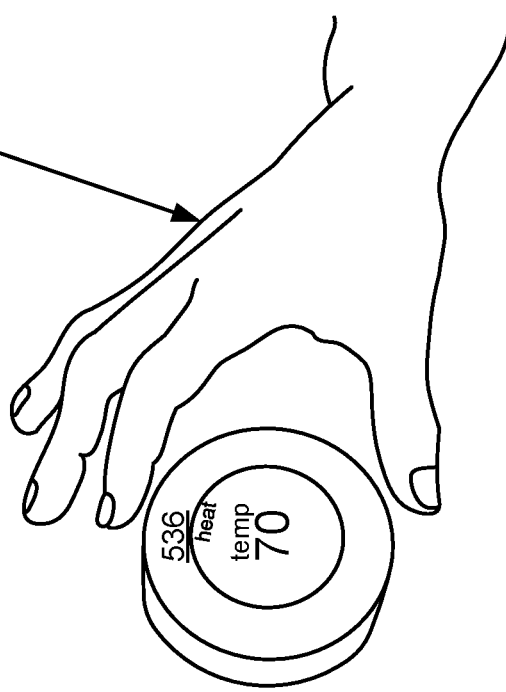

Referring to FIG. 5C, User A is now home and interacting with thermostat device 536. At this point, the context 520 may be updated to context 538. For example, when the User A adjusts the temperature in the home and asks "Where is everyone?," the context may be updated to context 538 based on detected device proximity scheme 540, the status of the household scheme 542, the understanding of natural language utterances scheme 544, and context aware microphone 546 on a device that received the task request of "Where is everyone?". In this example, the context 538 is associated with User A, as shown by block 548. The context 538 may include device contexts from any communal devices in the home, the click-wheel input at the thermostat 536, the microphone associated with context aware microphone 546, a speaker outputting information to User A, and an extra small display (of the thermostat 536), as indicated by block 550. The recent activity has not been tracked or displayed because User A (and/or other users) did not arrive at the home until recently and as such, block 552 depicts no known recent activity.

The context 538 may be based on the household composition, known devices, and state of the household, as shown by block 556. In this example, the distributed ambient computing system 200 may retrieve information that User A and User B are both registered for the household. In addition, system 200 may retrieve information about which devices are registered and/or otherwise configured for the household. In this example, a hub, a thermostat, and a smoke detector are configured for the household. In addition, the system 200 may detect, according to user permissions, that the home (e.g., household) currently includes User A and that a permission policy is configured.

Referring to FIG. 5D, a context 558 may be configured on assistant hub device 560, for example, taking into account other devices associated with the household of User A. Here, the context 558 is associated with User A, as shown by block 562. The context 558 may include device contexts from any communal devices in the home, the touchscreen input, microphone, speaker, camera and medium display associated with device 560, for example, as shown by block 564. The recent activity indicates that user B left a note, as shown by block 566. The ongoing activity block 568 is indicated as checking family status as User A continues to check the status of family members. The context 558 may be generated based on the household composition, known devices, and state of the household, as shown by block 570.

In this example, the assistant device 560 stored a note (i.e., in distributed repository 114, for example) that User B left and may provide such information to User A upon receiving a request to access such data or alternatively upon User B configuring device 560 to provide such information at a particular time or detected event.

In operation, the distributed ambient computing system 200 may retrieve information that User A and User B are both registered for the household. In addition, system 200 may retrieve information about which devices are registered and/or otherwise configured for the household. In this example, a hub, a thermostat, and a smoke detector are configured for the household. In addition, the system 200 may detect, according to user permissions, that the home (e.g., household) currently includes User A and that a permission policy is configured. The context 558 may be based on a relevant content scheme, a human to human mediation scheme, and a summarization scheme.

Figure 5E:
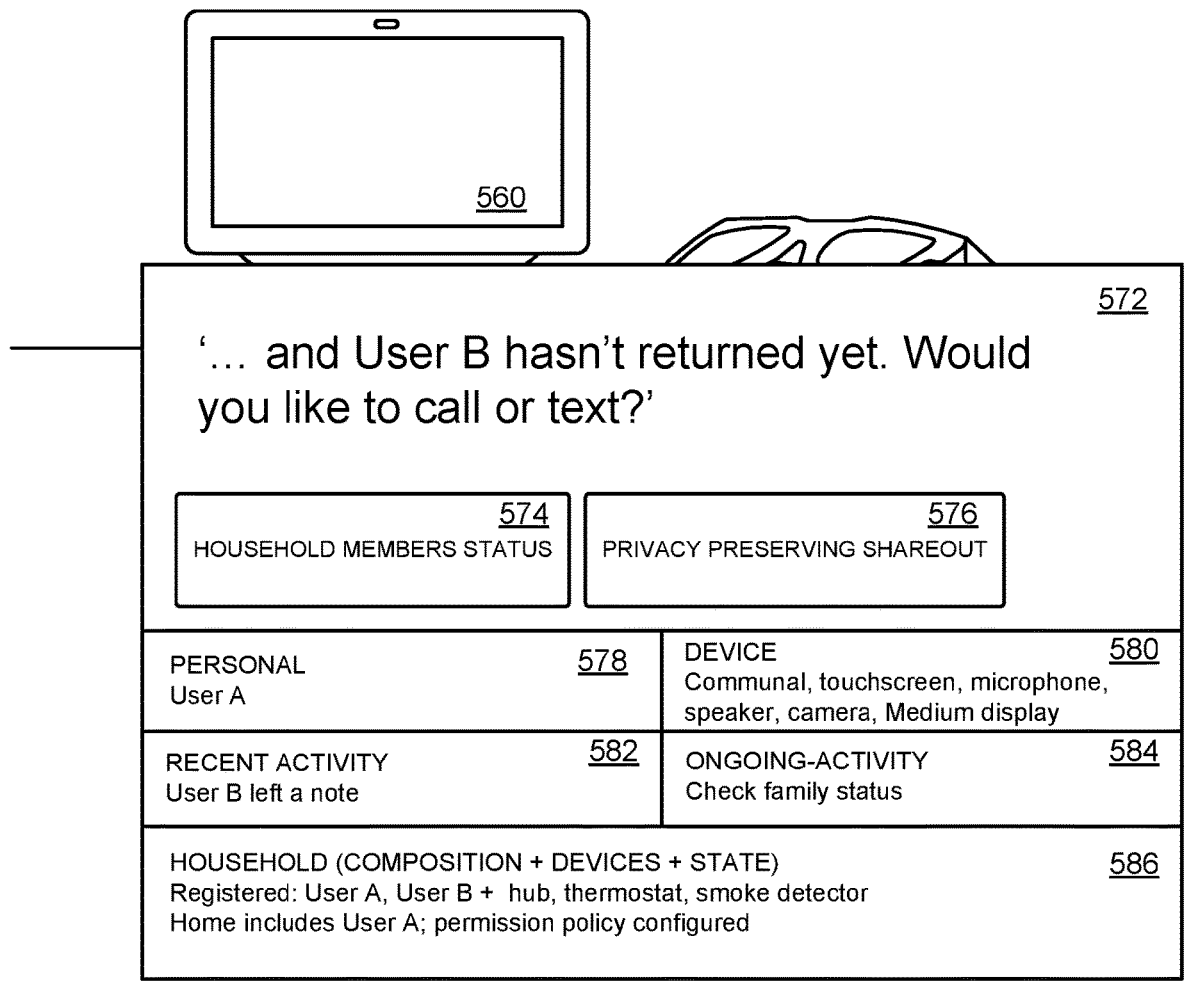

Referring to FIG. 5E, a context 572 may be updated from context 558 when device 560 determines that User B has not returned home. The device 560 may utilize household members status scheme 574 and privacy preserving share out protocol scheme 576 (along with user permissions) to determine such a status.

Here, the context 572 is associated with User A, as shown by block 578. The context 572 may include device contexts from any communal devices in the home, the touchscreen input, microphone, speaker, camera and medium display associated with device 560, for example, as shown by block 580. The recent activity indicates that user B left a note, as shown by block 582. The ongoing activity block 584 is indicated as checking family status as User A continues to check the status of family members. The context 572 may be generated based on the household composition, known devices, and state of the household, as shown by block 586.

In this example, the assistant device 560 detected that User B has not returned home. In response, the assistant notified User A and provided a decision to make. The decision point is based on the context(s) determined with respect to the household.

Referring to FIG. 5F, the User A made a decision and responded via device 587 to the decision point with "No, please just let User B know that I got home," as shown by updated context 588 which is based on human to human mediation schemes 589 and mindful notification schemes 590.

The context 588 is associated with User A, as shown by block 591. The context 588 may include device contexts from any communal devices in the home, the touchscreen input, microphone, speaker, camera and a small display associated with device 587, for example, as shown by block 592. The recent activity indicates that user B left a note, as shown by block 593. The ongoing activity block 594 is indicated as checking family status as User A continues to check the status of family members. The context 588 may be generated based on the household composition, known devices, and state of the household, as shown by block 595. In this example, a hub, a thermostat, and a smoke detector are configured for the household. In addition, the system 200 may detect, according to user permissions, that the home (e.g., household) currently includes User A using device 587 (unregistered) and that a permission policy is configured.

Referring to FIG. 5G, the User B is notified via mobile device 596 in a different location. The notification was sent from the household and may indicate User A as an author. In the home, the assistant device 560 sent the message to User B and thus the context of the home may be updated to context 597, which indicates an update to the ongoing activity for the assistant device (i.e., actively sending a message), as shown by block 598.

Particular schemes may be used to generate contexts in system 200. The schemes described herein may use device data, user data, and device sensors according to user configured permissions for the household and for the devices. Example schemes may include, but are not limited to, a geo fence scheme, a schedule scheme, a presence scheme, a device proximity scheme, a household scheme, a natural language utilization scheme, a context aware microphone scheme, a relevant content scheme, a human to human mediation scheme, a summarization scheme, a household members status scheme, a privacy preserving share out scheme, a mindful notifications scheme, a pets in household scheme, a downtime scheme, an activity detection scheme, a continuity flow scheme, a device mediation scheme, a reminders scheme, a user information scheme, a schedule scheme, a data structuration scheme, a proactive interruptions scheme.

The geo fence scheme may include detecting users near or at a location by combining signals and sensors from devices to establish with precision the physical presence of users at specific places and/or landmarks. The schedule scheme may include learning users' schedules by collecting signals from various source to determine user schedules. The presence scheme may include identifying user presences by assessing the physical presence of users in or near a particular household or location. The device proximity scheme may determine physical proximity from devices by determining which device is the closest from a user at any given time to optimize user experience by leveraging device sensors.

The household scheme may determine the composition of users and devices in a household (e.g., home) by identifying, storing such identities in distributed repositories, and tracking the composition. The natural language utilization scheme may provide accurate understanding of entities and natural utterances performed by users by establishing connections through time and space between users, locations, and objects mentioned in the natural utterances.

The context aware microphone scheme may perform context-informed end pointing by use of signals from the broad context to sustain or end an agent-linked microphone sensor attention and active listening. The relevant content scheme may use context as an indicator of relevance by identifying and emphasizing highly relevant pieces of information at the right time either proactively or upon user request. The human to human mediation scheme may use agents to interact with others by relying on agent knowledge and understanding of context to share, contact and connect with other users with efficiency and minimized disruption.

The summarization scheme may synthesize information for users by using compounded structured digests of long-form information along with agents sharing summarized pieces of information of behalf of other parties. The household members status scheme may use user status and pets in the household to perform agent-maintained and policy-guided status information for the household members, which may apply to locations and objects (e.g., where are my keys? Is there anyone in the living room?). The privacy preserving share out scheme may use agents that proactively share status of household members according to user permissions to help agents share basic information between household parties without compromising privacy. The mindful notifications scheme The pets in household scheme may identify and recognize pets while respecting user and pet privacy according to user permissions. The downtime scheme may respect time away from devices by confidently understanding when users are having time away from device and may attempt to use a respectful context to not bother the user unless an emergency occurs. The activity detection scheme may use sensors to assess activity according to user permissions by combining sensor data with context information to infer with precision what is the current activity of our users without requesting input and/or disambiguation. The continuity flow scheme ties tasks together across time and location by leveraging contextual reading to understand the relation between sub-tasks. For example, researching recipes on laptop at work could surface recipes on a hub assistant device at home if the user allows such access in user permissions.

The device mediation scheme may determine which device in a home is configured, capable, and adept to perform a particular task. For example, the device mediation scheme may combine the information shared by the surrounding devices and/or sensors to direct input and output to the appropriately suited device, according to user permissions. The reminders scheme may help a user by securely storing information for the user and provide one or more alerts when appropriate with respect to the stored information.

The user information scheme may secure user data according to user permissions. The user information may provide a secure way to ensure that user data is part of the user's core context. The schedule scheme may include calendar information. Such information may be both declared and inferred, according to user permissions.

The data structuration scheme may bring structure to freeform data by automating a process of structuring information provided by the user. Such structured information may be used for generating user and/or device contexts, according to user permissions. The proactive interruptions scheme may provide for devices to interrupt without being user-requested to provide information if, for example, the user permissions allow for discerning a time of engagement with users for providing valuable information that is capable of being communicated from the device to the user.

Further example schemes may include, but are not limited to a private broadcast scheme, a device cooperation scheme, a compounded signals scheme, a secure hardware scheme, a tokens scheme, a household devices scheme, a sensor scheme, a usage scheme, a reporting scheme, a household layout scheme, a household policies scheme, a communal activities scheme, a user categorization scheme, an activity learning scheme, and an activity teaching scheme.

The private broadcast scheme may determine when particular information can be audibly or visually communicated in the home. For example, the devices described herein may each have a confidence determiner to discern whether the user is in a private enough space for information to be provided visually and/or audibly. Such a determiner is configured according to user permissions.

The device cooperation scheme may combine sensor data cross devices to use the information from several, distinct sensors across several device to contribute to the understanding of the same task. The compounded signals scheme may increase confidence with several information sources to combine signals from several services that a user referred to its primary agent in order to build confidence in device task understanding.

The secure hardware scheme may utilize tokens, cryptographic techniques, or other methods to secure hardware devices. The scheme may provide support for dedicated hardware keys, hardware tokens, security keys and other types of verified pieces of hardware. The tokens scheme may use tools for security and presence to allow tokens to be used as a specific type of hardware dedicated to enshrining the security of some digital tasks (unlocking private devices or data sets).

The household devices scheme may consider the home (e.g., house, building, household) as a distributed ambient computing network of devices. This may help devices in a same household to collaborate and communicate. The sensor scheme may provide the ability for devices to combine the data from several sensors as if the devices are part of a distributed ambient computing system in order to build an understanding of user presence and activity, according to user permissions.

The usage scheme may assess usage patterns of devices in order to compile encrypted data about device usage for the distributed ambient computing system, according to user permissions. The reporting scheme may generate readable, private and tailored reports of both ambient and traditional computing activity, according to user permissions.

The household layout scheme may use nearby device sensing capabilities along with user reported data to generate maps of data and locations, according to user permissions. The household policies scheme may allow users to set rules for digital devices and data in order to allow users to manage the flow of information and communication policies of their devices, according to user permissions.

The communal activities scheme may describe user activities based on schedule user tasks and/or activities involve multiple users. The scheme may enable devices to act appropriately with regard to remembering, notifications, privacy, according to user permissions. The user categorization scheme may categorize elements before recognizing such elements. For example, the user categorization scheme may identify entities by categories before individuals, according to user permissions.

The activity learning scheme may enable agents to proactively learn about which tasks are important to their users, which parameters of those tasks are relevant and how to tune those parameters for a preferable outcome for the user, according to user permissions. The activity teaching scheme may integrate user feedback in the learning loops of agents.

FIGS. 6A-6E are block diagrams illustrating another example use of context to generate information for a user operating one or more devices within a distributed ambient computing system, in accordance with implementations described herein. In this example, User C may be assigned the task of letting the household pets out at the same time everyday and before leaving the home.

Particular contexts for User C and the devices in the home of User C may allow for reminders and monitoring of User C to ensure that the user performs that task of letting the pets outside. To use such reminders and monitoring, the User C sets up user permissions to allow for particular devices to monitor during particular time periods. For example, if the user is to let the pets outside between 6:00 AM and 6:30 AM each day, the user may set devices near the location of a particular door in the home to monitor (within the household network and not to be distributed) such that the letting the pets outside activity can be monitored. If the activity does not occur, the devices set to monitor the user may trigger reminders to the User C or users that the User C selects to receive such reminders.

Figure 6A:
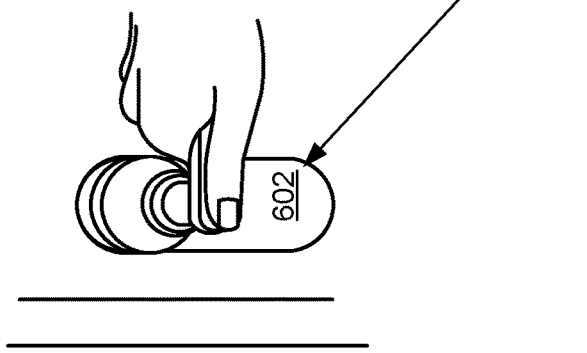
FIGS. 6A-6E are block diagrams illustrating another example use of context to generate information for a user operating one or more devices within a distributed ambient computing system, in accordance with implementations described herein.

As shown in FIG. 6A, the User C (e.g., user 602) may forget to let the pets out on a particular day. In this example, the User C may leave the home without performing the activity. The system 200 may determine an initial context 604 of the home. The initial context 604 may be based on reminder schemes 606 and/or user data schemes 608, according to user configured permissions.

Here, the context 604 is associated with User C, as shown by block 610. The context 604 may include device contexts from any registered device for the home, but in this example, the devices are not yet in use for the time period associated with context 604, as shown by block 612. Similarly, no recent activity is detected in the home according to user permissions and no ongoing activity is being performed, as shown by respect block 614 and block 616.

The context 604 may be generated based on the household composition, known devices, and state of the household, as shown by block 618. In this example, the household (e.g., home) includes User C who lives alone with a pet-smart display device, a mobile device, and a smart speaker device, as shown in block 618.

Figure 6B:
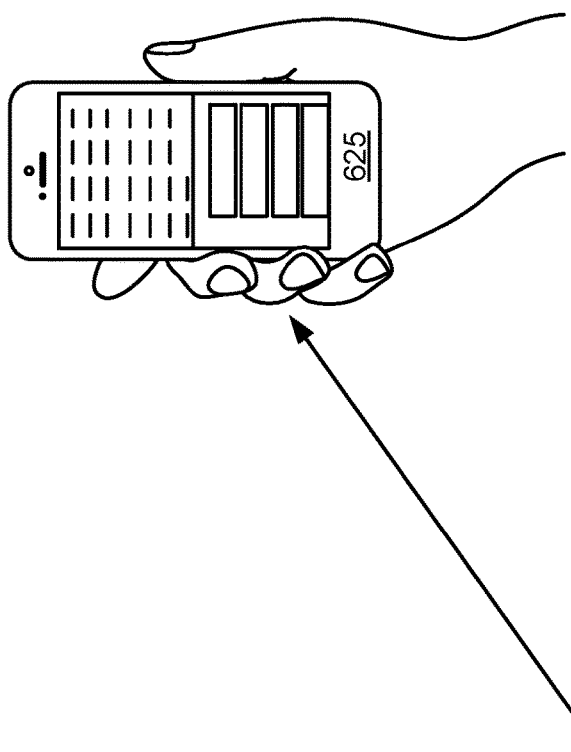

Referring to FIG. 6B, the User C will be out of the home, according to her calendar schedule accessed by system 200, for example. Based on this schedule, a context 620 may be generated. For example, the context 620 may be generated based on a schedule scheme 622 and a data structuration scheme 624. When the user enters the scheduling event in her calendar, the mobile device 625 may trigger generation of the context 620.

The context 620 is associated with User C, as shown by block 626. The context 620 may include device contexts from any devices registered for the home. In this example, the devices include a mobile device 625 that includes a touchscreen, a microphone, a speaker, a camera, and a small display, as indicated at block 628. The recent activity has not been tracked or displayed because User C (and/or other users) were not active during the time period before the context 620. The ongoing activity is updated to show that the user is updating her calendar, as indicated at block 632.

The context 620 may be based on the household composition, known devices, and state of the household, as shown by block 634. In this example, the distributed ambient computing system 200 may retrieve information that User C is scheduling to be out of the home near to the time slated to let the pets out. In addition, system 200 may retrieve information about which devices are registered and/or otherwise configured for the household. In addition, the system 200 may detect, according to user permissions, that the home (e.g., household) currently includes User C and that a permission policy is configured, as shown at block 634.

Figure 6C:
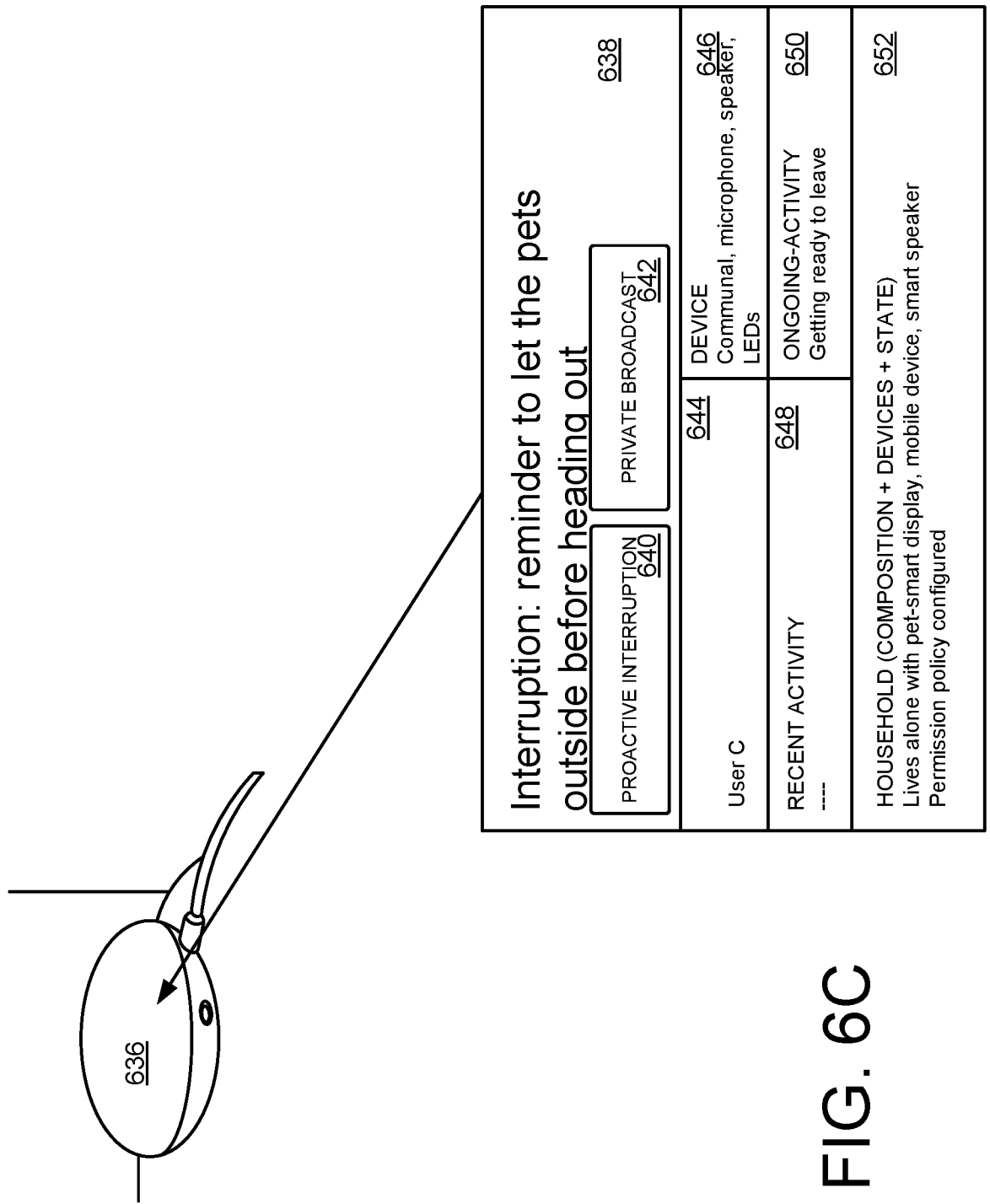

Referring to FIG. 6C, the context 620 may trigger a reminder to be provided to the User C upon her way out the door. For example, the system 200 may determine that the user is nearing a time to leave the home. In response, a device (e.g., communal speaker device 636 may trigger the reminder to be played for the User C. A new context 638 may then be generated. The context 638 is based on a proactive interruption scheme 640 and a private broadcast scheme 642.

The context 638 is associated with User C, as shown by block 644. The context 638 may include device contexts from any devices registered for the home. In this example, the devices include the communal speaker device that includes a microphone, a speaker, and light emitting diodes (LEDs), as indicated at block 646. The recent activity for device 648 has not been tracked or displayed because User C (and/or other users) were not active with device 636 during the time period before the context 638. The ongoing activity is updated to show that the user is getting ready to leave, as indicated at block 650.

The context 638 may be based on the household composition, known devices, and state of the household, as shown by block 652. In this example, the distributed ambient computing system 200 may retrieve information that User C is leaving the home and that a reminder (task) has been provided by device 636. In addition, system 200 may retrieve information about which devices are registered and/or otherwise configured for the household. The system 200 may detect, according to user permissions, that the home (e.g., household) currently includes User C and that a permission policy is configured, as shown at block 652.

Figure 6D:
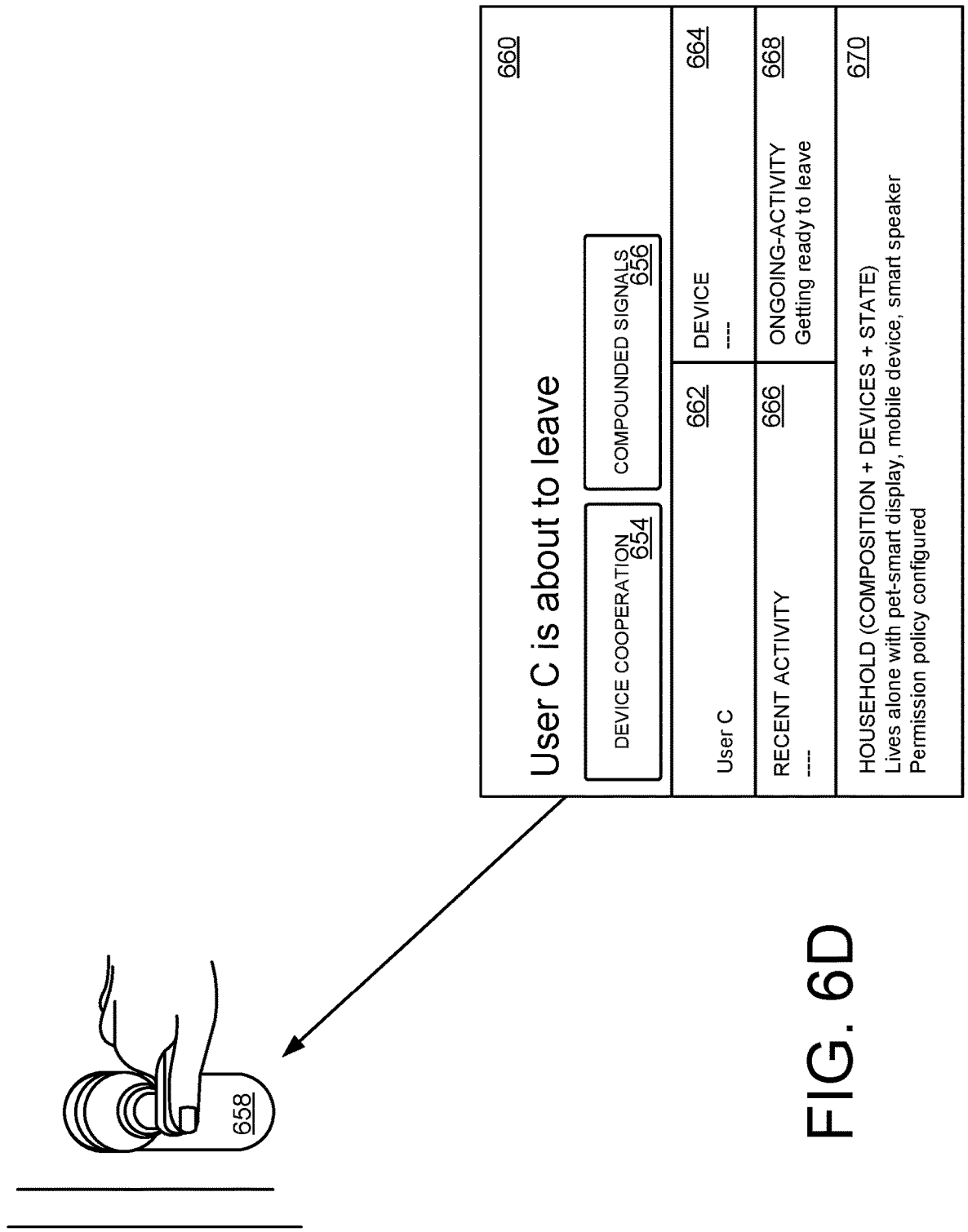

Referring to FIG. 6D, one or more of the household devices may determine that the is about to leave using a device cooperation scheme 654 and a compounded signals scheme 656, as shown by electronic door lock device 658. Accordingly, the context may be updated, as shown by context 660.

The context 660 is associated with User C, as shown by block 662. The context 660 may include device contexts from any devices registered for the home. In this example, the devices may determine the user's location in the home, according to user permissions. The devices may also use the calendar entry to determine when the User C is exiting the home. Here, the devices may not be listed in device block 664 because the devices may not have been newly triggered to send data since context 638. The door lock device 658 may alternatively be listed in device block 664, but in this example, the door lock device 658 is not a registered device for the household. Thus, the recent activity for device 658 has not been tracked or displayed. The ongoing activity is updated to show that the user is getting ready to leave, as indicated at block 668. The context 660 may be based on the household composition, known devices, and state of the household, as shown by block 670.

Figure 6E:
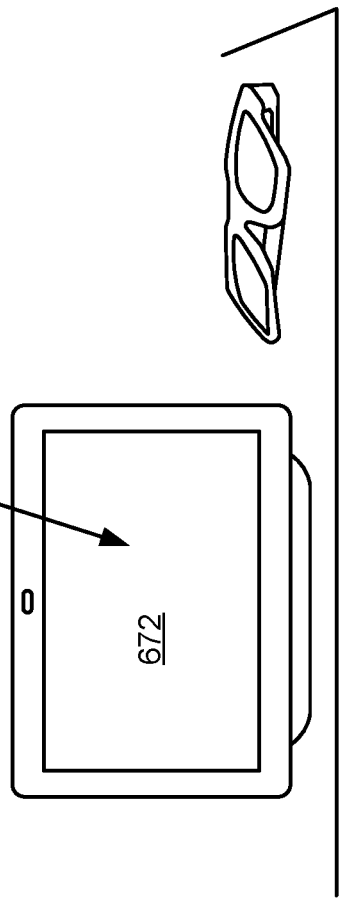

Referring to FIG. 6E, the reminder to let the pets out that the user set on her mobile device may trigger an ambient reminder to the user on a device near to the user, according to user permissions. For example, an assistant device 672 (e.g., the pet-smart display) may be registered and configured to generate an ambient reminder to let the pets out the moment User C awakens. A context 674 may be generated to enable and trigger such a reminder. The context 674 may be based on a proactive interruption scheme 676 and a private broadcast scheme 678.

The context 674 is associated with User C, as shown by block 680. The context 674 may include device contexts from any devices registered for the home. In this example, the devices include the communal speaker device that includes a microphone, a speaker, and a medium display, as indicated at block 682. The recent activity for device 672 has not been tracked or displayed because User C (and/or other users) were not active with device 672 during the time period before the context 674. The ongoing activity is updated to show that the user is getting ready to leave, as indicated at block 686.

The context 674 may be based on the household composition, known devices, and state of the household, as shown by block 688. In this example, a reminder may be provided to the user's mobile device (not shown) to ensure that the pets are let outside before she exits the home.

Figure 7:
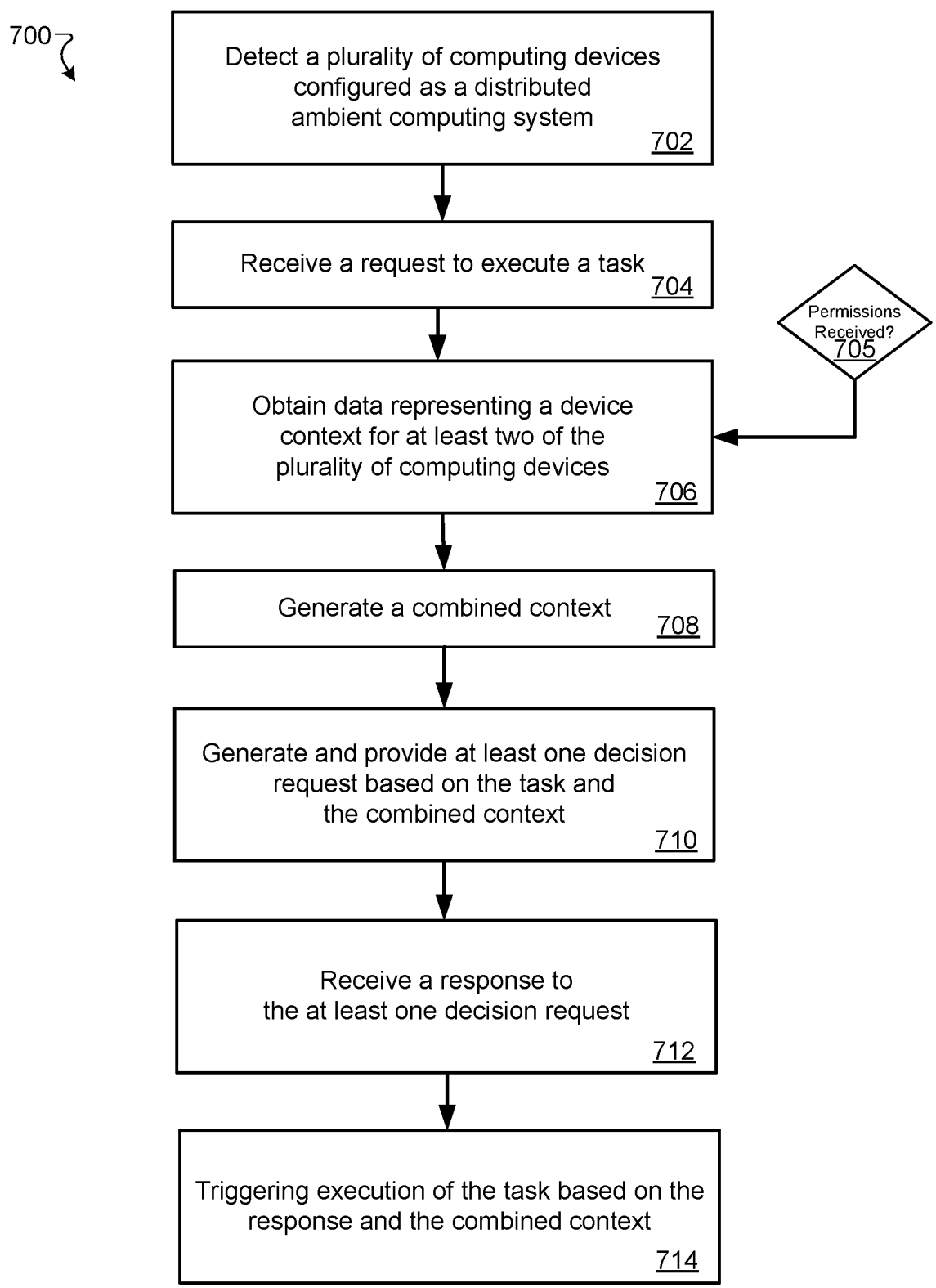
FIG. 7 is a flowchart of an example process of operating a distributed ambient computing system to determine and share device contexts amongst multiple electronic devices, in accordance with implementations described herein.

FIG. 7 is a flowchart of an example process 700 of operating a distributed ambient computing system to determine and share device contexts amongst multiple electronic devices, in accordance with implementations described herein. The process 700 may ensure that devices in a defined user environment may communicate, share, and execute tasks and contexts to ensure that users receive relevant information via the devices. The process 700 may be described with reference to system 200, for convenience. In some implementations, devices described throughout this disclosure may operate as other devices within system 200. For example, assistant device 112 may operate as computing system 202 including the components of both system 202 and device 112.

At block 702, the process 700 includes detecting, by a computing device, a plurality of additional devices configured as a distributed ambient computing system. In some implementations, devices within the plurality of computing devices of the distributed ambient computing system may be communicably coupled to carry out a variety of tasks on a single device or using a combination of any or all devices. At some point, the system 200 may determine whether or not user permissions (e.g., policies and permissions 252) have been received or configured by the user to allow the use of data associated with the devices and/or computing devices described herein. For example, at block 705, the system 200 may perform a permissions check to ensure that device data may be used. Although the permissions check is shown at a single block, permissions may be requested and verified at any or all of the blocks.

At block 704, the process 700 includes receiving, at the computing device, a request to execute a computing task. For example, a user may generate a request to perform a computing task. The request may be verbally provided (or via computing device) as a command, a question, a query, and the like. In some implementations, the request may originate from one or more of the plurality of computing devices of the distributed ambient computing system.

At block 706, the process 700 includes obtaining, from the distributed ambient computing system, data representing a device context for at least two of the plurality of devices. For example, the data may include any combination of device capabilities, preconfigured permissions, device status, device location, user settings, user permissions, time settings, device capabilities, user location, device location, user environment changes, and the like.

At block 708, the process 700 includes generating, by the computing device, a combined context for the distributed ambient computing system. The combined context may represent a combination of the device context obtained for the at least two devices and may be based on and/or include the signals and schemes described herein. In some implementations, the combined context may take into account multiple devices in the distributed ambient computing system as well as locations, structures, and services associated with the distributed ambient computing system.

At block 710, the process 700 includes generating and providing, by the computing device, at least one decision request based on the task and the combined context. For example, responsive to the request, the system 200 may generate a decision request to obtain an answer from a user or device. The decision request may be provided via a computing device to another computing device. For example, a first assistant computing device (e.g., a home assistant) may verbally provide the decision request to a user. In some implementations, the assistant device may instead generate and send a message to a second computing device associated with the user. The user may provide a verbal response to the request or a response via the second device (or another device configured with distributed ambient computing system 100).

At block 712, the process 700 includes receiving, at the computing device, a response to the at least one decision request. For example, a user may verbally (or via a computing device) submit a response to the decision request, which is received by system 200. In an example, the computing task may be a request to configure a service on the at least two devices and the data may include a device type and an operating system for each of the at least two devices. The combined context may include an indication for whether or not each of the at least two devices are available for use. The at least one decision request may be a query indicating whether the computing task is to be performed on the at least two devices. A user or device may confirm, deny, or provide another answer to the request for a decision. In response to detecting a confirmation to perform the computing task on the at least two devices, the system 200 may configure the service (i.e., perform the computing task) for the at least two devices.

In some implementations, the systems and methods described herein may not carry out block 710 and/or block 712 described above. Instead, a device that is detecting and generating requests for the system may determine information used to execute the requested computing tasks according to determined contexts associated with the distributed ambient computing system.

At block 714, the process 700 includes triggering, by the computing device, execution of the computing task based on the response and the combined context. For example, system 200 may assess the response and the combined context to determine how to execute the computing task.

In some implementations, the system 200 may distribute the combined context to the plurality of computing devices configured as the distributed ambient computing system. Such a distribution of the combined context may trigger execution of the computing task on two or more of the plurality of devices. For example, if the user requests to play music, the system 200 may assess two or more of the plurality of devices to determine a context for the requesting device as well as a combined context for one or more of the remaining devices in the system 100. The system 200 may then provide a decision request to a device or device user to await an answer. The received answer may determine whether to perform the computing task, how to perform the computing task, and which devices to utilize to perform the computing task.

In some implementations, the at least two devices are selected, by system 200, based on a determined physical location of each respective device. For example, if the user requested computing task is to configure a security system, the system 200 may determine that a household speaker and a smart display within a particular building can function as a security system. The two devices may be correlated and configured to function together to monitor a room or home similar to a security system. The speakers may function to deter theft if the smart display detects movement as the smart display may capture events carried out while an owner of the house is away. In some implementations, the combination of devices may be possible based on the device context being based at least in part on device capabilities, preconfigured permissions, and device location, for example. The combined context may be generated in response to determining that the at least two devices are configured to operate together to perform the computing task.

In some implementations, the combined context is configured to enable the plurality of devices to trigger a private mode according to preconfigured permissions associated with the distributed ambient computing system. The private mode may be configured to invoke the preconfigured permissions to obfuscate content associated with each respective device and block access to one or more functions associated with each respective device.

In some implementations, the request is a verbal request. In addition, the combined context may further represent the plurality of computing devices configured for the distributed ambient computing system. In such examples, the computing task is distributed for completion on two or more of the plurality of computing devices based on the combined context.

In some implementations, the distributed ambient computing system is configured for a building associated with the plurality of computing devices. For example, the distributing ambient computing system may provide a digital identity for the building, which can be used to ascertain which devices are available, which devices function together, which services can be (or are currently) configured for particular devices, etc.

Figure 8A:
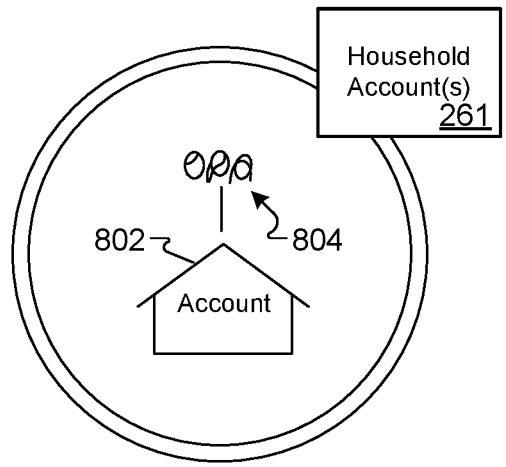
FIGS. 8A-8B are block diagrams illustrating example elements of household accounts in a distributed computing system, in accordance with implementations described herein.
Figure 8B:
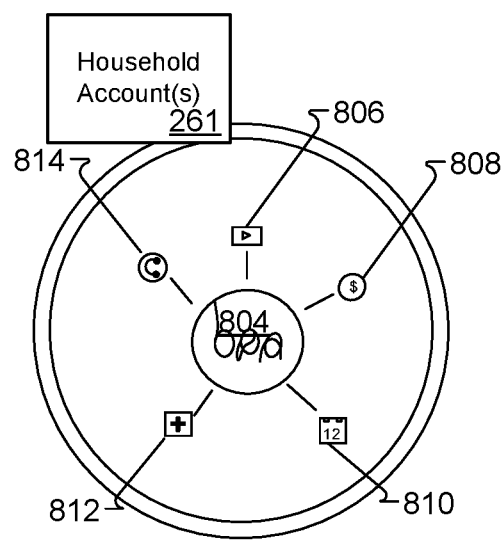

FIGS. 8A-8B are block diagrams illustrating example elements of household accounts in a distributed computing system, in accordance with implementations described herein. The household accounts 261 may allow buildings of users (e.g., households, renters, offices, etc.) to conveniently share information amongst devices configured with the household account and the distributed computing system 200, for example.

As shown in FIG. 8A, a home 802 is depicted associated with the household account 261 and users 804. The household account 261 may be used to configure the users 804 as a household group. The household group may be provided services for the home. The household account 261 may provide common control of the space, infrastructure, and devices associated with the home 802. In addition, the household account 261 may be used to up level preferences from device to device and to up level services to the home 802.

As shown in FIG. 8B, the users 804 are shown with shared resources including, but not limited to, media 806, expenses 808, calendars 810, user data 812, and streaming media 814. The users 804 may leverage the household account 261 to share the resources. In particular, a household group configured for the household account 261 may provide a platform operating as a distributed computing system (of devices registered for the home) which may assess and use relationships amongst devices, tasks, users, etc. to ensure that resources may be shared according to user permissions and household policies.

Figure 9:
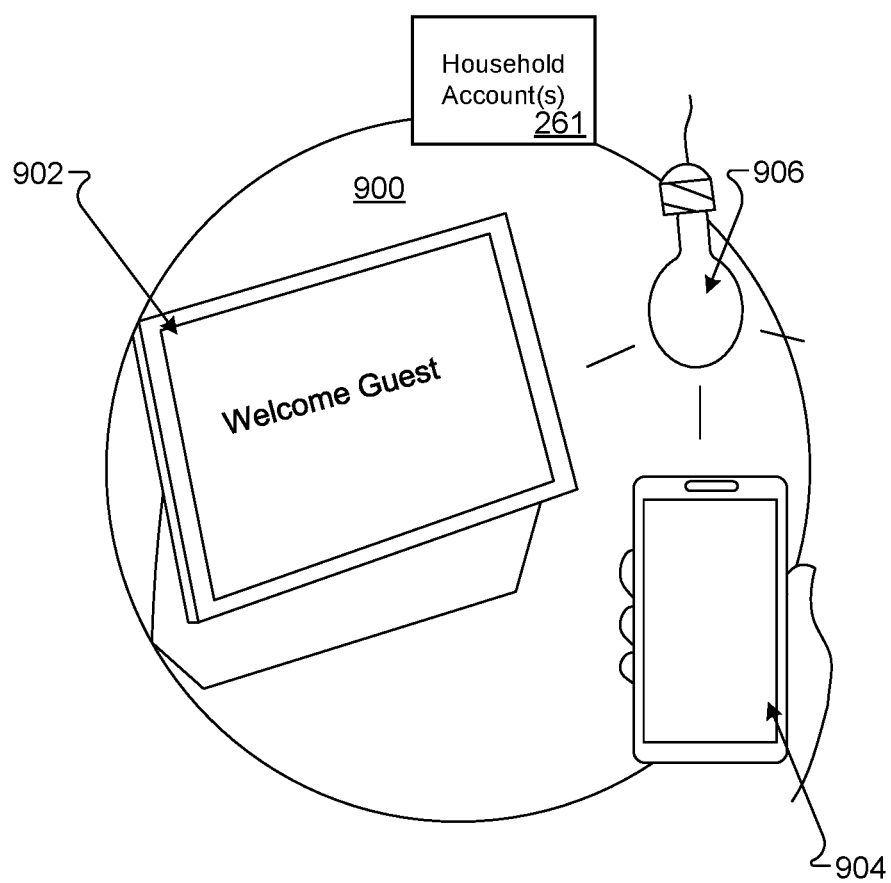
FIG. 9 illustrates providing modes within a household using ambient devices, in accordance with implementations described herein.

FIG. 9 illustrates providing modes within a household using ambient devices, in accordance with implementations described herein. A location 900 is defined to include any number of devices located within range. Devices within the location 900 may be configured by system 200, for example, for any number of users as part of a particular household associated with location 900, which may be used to generate a distributed computing system. The location 900 may be or represent a user environment including, but not limited to a home, a household, a residence, a business, etc.

As shown in FIG. 9, a hub device 902 may welcome a guest in a guest mode. In a guest mode, the household may host visitors to the location 900 without having to provide home instruction manuals, passwords, and the like. Instead, because location 900 may be associated with a distributed computing system, the system may offer guests particular device use, services and/or connections that the user previously provisioned for the guest mode. For example, users may provide Wi-Fi network enablement on a guest mobile device 904, but may alert other devices in the household of connection to such a network in case a particular connected device is unrecognized. Similarly, the device 902 may provision access and control of lighting devices 906 via guest mobile device 904. Privacy of the household may be protected since household data is either not sent to a guest device or is instead hidden from the guest device while still providing the service and/or device usage to the guest device.

In some implementations, the location 900 may use context to hide data from guests. Such context may trigger the privacy mode. The privacy mode may include dynamic authentication allowing for concurrent and sequential multi-user usage of the services and/or devices at location 900. In addition, the privacy mode may be provided for particular users, which can be managed in real time based on device placement and presence. For example, devices in a bedroom may trigger a privacy mode during scheduled meetings, household visits, or when users are not home, while devices in a dining area may trigger a different privacy mode obscuring some data, but not all data. The privacy mode may also be managed by presence, relationships and activities occurring at the location 900.

Figure 10A:
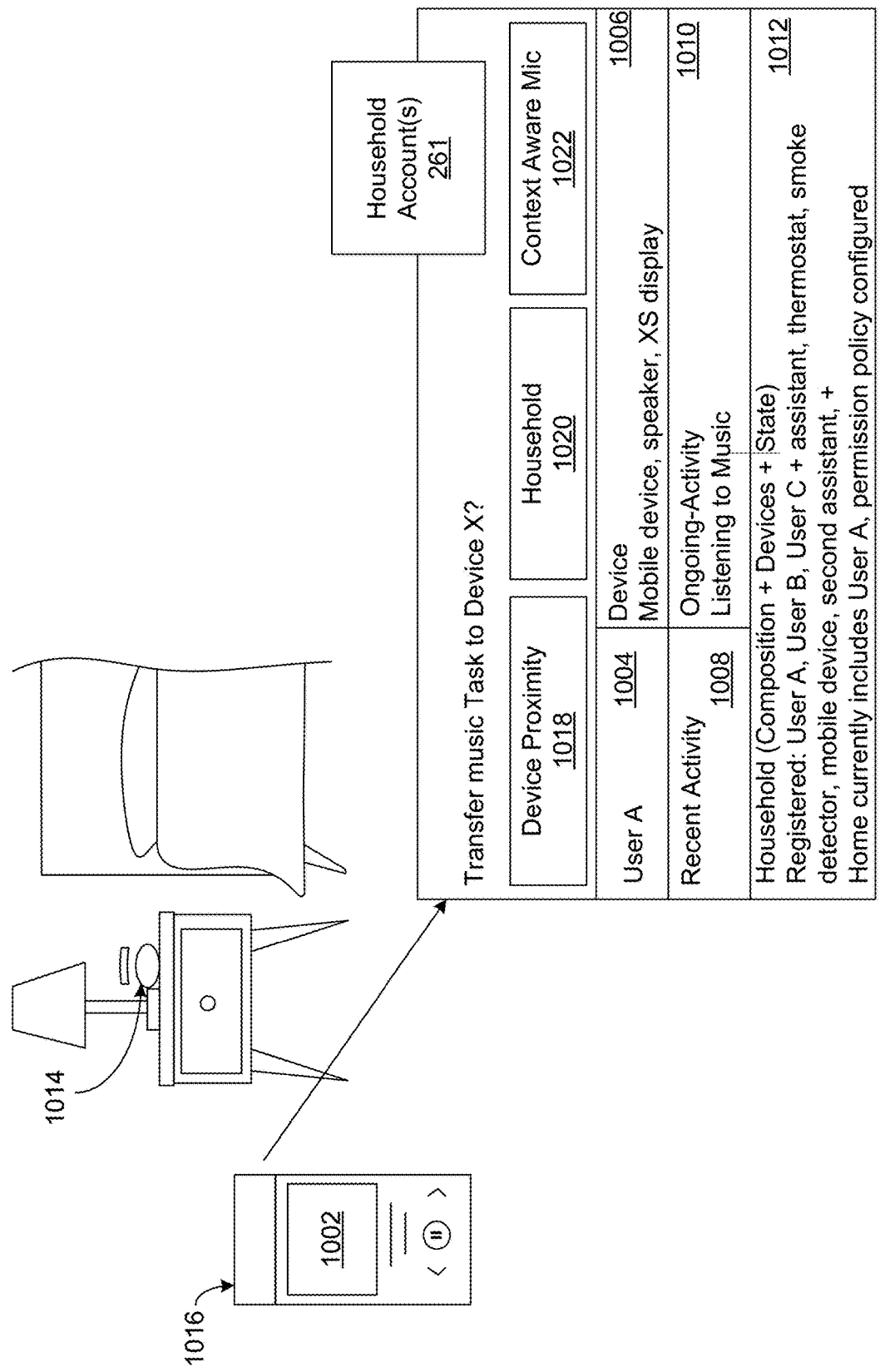
FIGS. 10A-10B illustrate the user of a household account to predict and control device behavior, in accordance with implementations described herein.

FIG. 10A depicts use of a household account to predict device behavior based on user preferences and household account policies. In this example, a user (not shown) may be listening to music on mobile device 1002 when the user arrives at his home. The mobile device 1002 may be configured with the household account 261. The household account 261 may have policies configured for each user and any number of user states or device states. For example, the household account 261 may be configured, according to user permission and user calendars, to determine that the user is the only member home. The user may have device policies configured with the household account 261 for when the user is home alone. For example, the volume level of particular devices may be set at a loud level for the user to enjoy music when other users are not home. The policy may be triggered to change if, for example, another user enters the home. Such policies are user configured using device permissions, user permissions, and/or other secure configurations for the home.

As shown in FIG. 10A, the household account 261 may determine that User A is arriving home as shown by block 1004. The account 261 may store devices currently in use, which in this example include the mobile device 1002, which includes a speaker and an extra small display in use, as shown by block 1006. In addition, the account 261 may function with distributed computing system 200 to determine that there is no recent activity for the household, as shown in block 1008 and that the User A is engaged in an ongoing activity of currently listing to music, as shown by block 1010. In addition and currently listening to music user In addition, system 200 may retrieve information about which devices are registered and/or otherwise configured for the household according to the household account 261. In this example, the household block 1012 depicts a composition, devices, and state for the home. Here, that includes an assistant, a thermostat, a smoke detector, a mobile device, and a second assistant are configured for the household. In addition, the system 200 may detect, according to user permissions, that User A is the user that is home, and that a permission policy is configured.

At some point, the user enters the home and may move toward the bedroom, which houses a second assistant device 1014. In response, the household account policies, settings, and permissions may trigger a notification 1016 to request a transfer the task of playing the music from the mobile device 1002 to the assistant device 1014. For example, the household account 261 may access device proximity data 1018, household data 1020, and context aware microphone data 1022 according to preconfigured user permissions. Such data 1018-1020 can ensure that the household account 261 may have access to home contexts, device contexts, device states, user preferences, and the like.

In response, the user may select the transfer of music notification to transfer music. In some implementations, the notification may be audible and the user may respond by uttering a command or response to transfer or not transfer the task of playing music between devices. In addition, the user may control the music queue and volume of the stream using the assistant device 1014 or the mobile device 1002 depending on which device the music is streaming from.

Figure 10B:
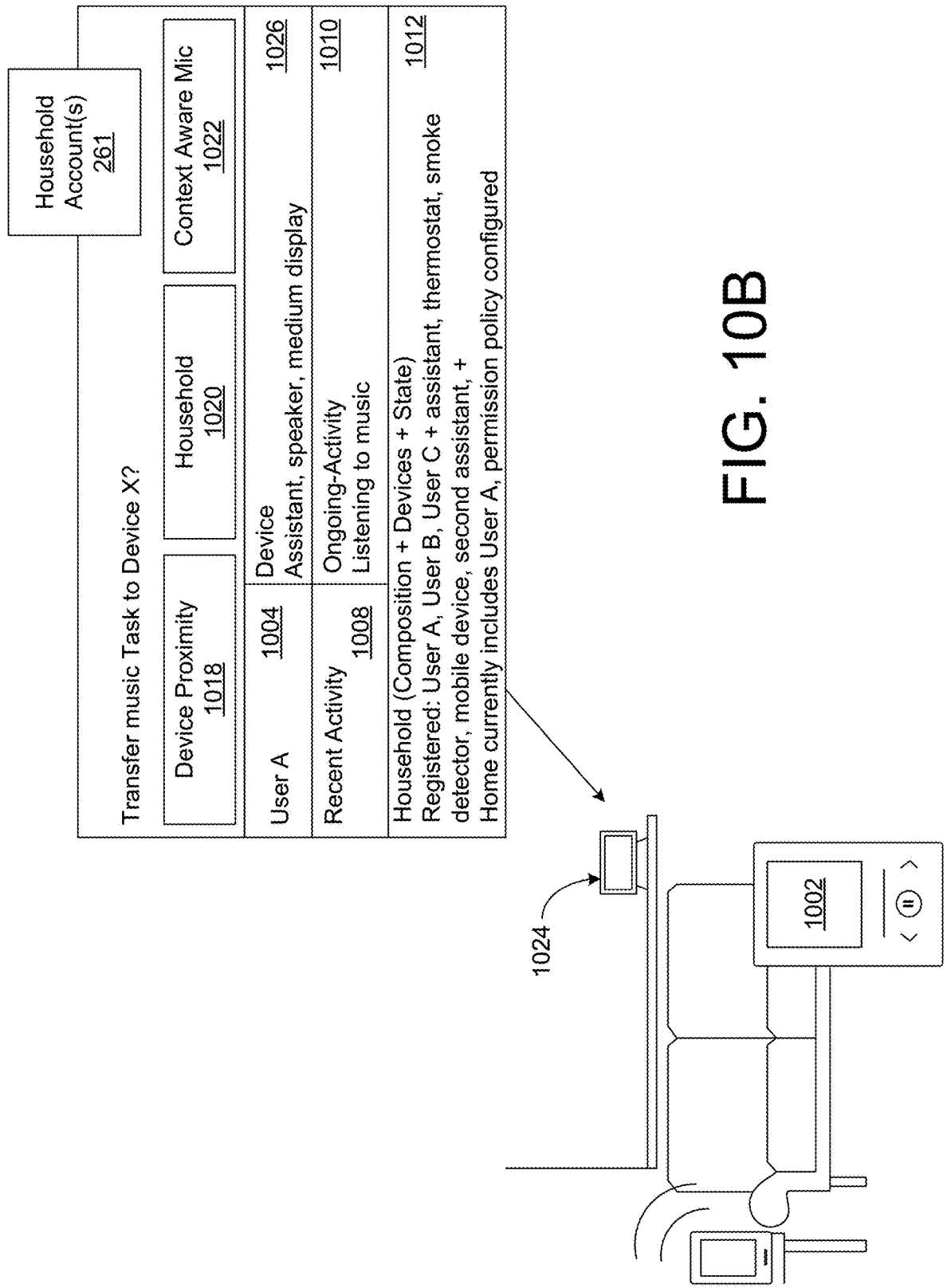

Referring to FIG. 10B, the user may continue walking through the home to arrive in the family room. In this example, the household account 261 in combination with the distributed computing system 200 may determine that the user is in the room with an assistant device 1024. Accordingly, a communication (e.g., a suggestion) may be triggered to ask if the user wises to transfer the task of playing music to the assistant device 1024 from the mobile device 1002.

The user may take the suggestion and allow the transfer of the music task to begin playing the music on the assistant device 1024. The assistant device includes both visual and an audio abilities, and accordingly, a music video may also trigger execution on the assistant device 1024 along with the audio. The household account 261 may then update the context of the home, for example, by changing the device block 1026 to reflect the new device (assistant device 1024) is the device operating in the home.

Figure 11:
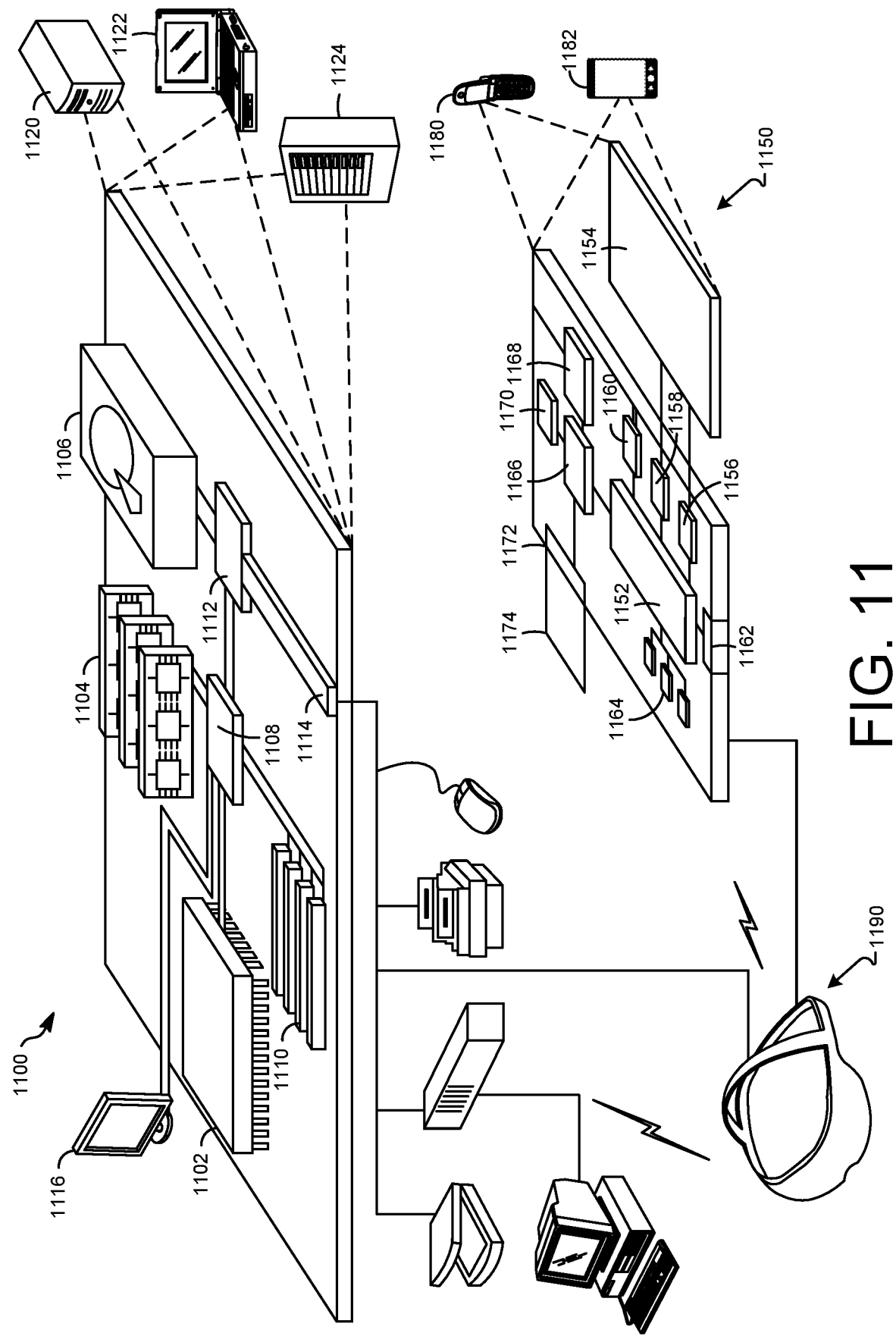
FIG. 11 shows an example of a computer device and a mobile computer device that can be used to implement the techniques described herein.

FIG. 11 shows an example of a computer device 1100 and a mobile computer device 1150, which may be used with the techniques described here. Computing device 1100 is intended to represent various forms of digital computers, such as laptops, desktops, tablets, workstations, personal digital assistants, smart devices, appliances, electronic sensor-based devices, televisions, servers, blade servers, mainframes, and other appropriate computing devices. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. The processor 1102 can be a semiconductor-based processor. The memory 1104 can be a semiconductor-based memory. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk. In general, the computer-readable medium may be a non-transitory computer-readable medium.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods and/or computer-implemented methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as modules, programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor, or LED (light emitting diode)) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user is provided with controls allowing the user to make an election as to both if and when systems, programs, devices, networks, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that user information is removed. For example, a user's identity may be treated so that no user information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The computer system (e.g., computing device) may be configured to wirelessly communicate with a network server over a network via a communication link established with the network server using any known wireless communications technologies and protocols including radio frequency (RF), microwave frequency (MWF), and/or infrared frequency (IRF) wireless communications technologies and protocols adapted for communication over the network.

In accordance with aspects of the disclosure, implementations of various techniques described herein may be implemented in digital electronic circuitry, or in computer hardware, firmware, software, or in combinations of them. Implementations may be implemented as a computer program product (e.g., a computer program tangibly embodied in an information carrier, a machine-readable storage device, a computer-readable medium, a tangible computer-readable medium), for processing by, or to control the operation of, data processing apparatus (e.g., a programmable processor, a computer, or multiple computers). In some implementations, a tangible computer-readable storage medium may be configured to store instructions that when executed cause a processor to perform a process. A computer program, such as the computer program(s) described above, may be written in any form of programming language, including compiled or interpreted languages, and may be deployed in any form, including as a standalone program or as a module, component, subroutine, or other unit suitable for use in a computing environment. A computer program may be deployed to be processed on one computer or on multiple computers at one site or distributed across multiple sites and interconnected by a communication network.

Specific structural and functional details disclosed herein are merely representative for purposes of describing example embodiments. Example embodiments, however, may be embodied in many alternate forms and should not be construed as limited to only the embodiments set forth herein.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

Spatially relative terms, such as "beneath," "below," "lower," "above," "upper," and the like, may be used herein for ease of description to describe one element or feature in relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 70 degrees or at other orientations) and the spatially relative descriptors used herein may be interpreted accordingly.

Example embodiments of the concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the described concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Unless otherwise defined, the terms (including technical and scientific terms) used herein have the same meaning as commonly understood by one of ordinary skill in the art to which these concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain features of the described implementations have been illustrated as described herein, many modifications, substitutions, changes, and equivalents will now occur to those skilled in the art. It is, therefore, to be understood that the appended claims are intended to cover such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

What is claimed is:

1. A computer-implemented method, comprising:
   detecting a plurality of devices configured as a distributed ambient computing system;
   receiving a request to execute a computing task;
   obtaining, from the distributed ambient computing system, data representing a device context for at least two of the plurality of devices;
   generating a combined context corresponding to the distributed ambient computing system, the combined context representing a combination of the device context for the at least two of the plurality of devices;
   generating and providing at least one decision request based on the computing task and the combined context;
   receiving a response to the at least one decision request; and
   triggering execution of the computing task based on the response and the combined context.

2. The computer-implemented method of claim 1, wherein:
   the computing task is to configure a service on the at least two of the plurality of devices;
   the data includes a device type and an operating system for the at least two of the plurality of devices;
   the combined context includes an indication for whether the at least two of the plurality of devices are available for use;
   the at least one decision request is a query indicating whether the computing task is to be performed on the at least two of the plurality of devices; and in response to detecting a confirmation to perform the computing task on the at least two of the plurality of devices, configuring the service for the at least two of the plurality of devices.

3. The computer-implemented method of claim 1, further comprising:
distributing the combined context to the plurality of devices configured as the distributed ambient computing system, wherein distributing the combined context triggers execution of the computing task on two or more of the plurality of devices.

4. The computer-implemented method of claim 1, wherein:
the at least two of the plurality of devices are selected based on a determined physical location of each respective device; and
the combined context is used to configure the at least two of the plurality of devices to function together to execute the computing task.

5. The computer-implemented method of claim 1, wherein:
the request comprises a verbal request;
the combined context further represents the plurality of devices configured for the distributed ambient computing system; and
the computing task is distributed for completion on two or more of the plurality of devices based on the combined context.

6. The computer-implemented method of claim 1, wherein:
the device context is based at least in part on device capabilities, preconfigured permissions, and device location; and
the combined context is generated in response to determining that the at least two of the plurality of devices are configured to operate together to perform the computing task.

7. The computer-implemented method of claim 1, wherein the combined context is configured to enable the plurality of devices to trigger a private mode according to preconfigured permissions associated with the distributed ambient computing system, the private mode being configured to invoke the preconfigured permissions to obfuscate content associated with the at least two of the plurality of devices and block access to one or more functions associated with the at least two of the plurality of devices.

8. The computer-implemented method of claim 1, wherein the distributed ambient computing system is configured for a building associated with the plurality of devices, the distributed ambient computing system providing a digital identity for the building.

9. A non-transitory computer-readable medium comprising:
at least one processor; and
a memory storing instructions that, when executed by the at least one processor, cause the at least one processor to perform operations comprising:
detecting a plurality of devices configured as a distributed ambient computing system;
receiving a request to execute a computing task;
obtaining, from the distributed ambient computing system, data representing a device context for at least two of the plurality of devices;
generating a combined context corresponding to the distributed ambient computing system, the combined context representing a combination of the device context for the at least two of the plurality of devices;
generating and providing at least one decision request based on the computing task and the combined context;
receiving a response to the at least one decision request; and
triggering execution of the computing task based on the response and the combined context.

10. The non-transitory computer-readable medium of claim 9, wherein:
the computing task is to configure a service on the at least two of the plurality of devices;
the data includes a device type and an operating system for the at least two of the plurality of devices;
the combined context includes an indication for whether the at least two of the plurality of devices are available for use;
the at least one decision request is a query indicating whether the computing task is to be performed on the at least two of the plurality of devices; and
in response to detecting a confirmation to perform the computing task on the at least two of the plurality of devices, configuring the service for the at least two of the plurality of devices.

11. The non-transitory computer-readable medium of claim 9, wherein the operations further comprise:
distributing the combined context to the plurality of devices configured as the distributed ambient computing system, wherein distributing the combined context triggers execution of the computing task on two or more of the plurality of devices.

12. The non-transitory computer-readable medium of claim 9, wherein:
the request comprises a verbal request;
the combined context further represents the plurality of devices configured for the distributed ambient computing system; and
the computing task is distributed for completion on two or more of the plurality of devices based on the combined context.

13. The non-transitory computer-readable medium of claim 9, wherein:
the device context is based at least in part on device capabilities, preconfigured permissions, and device location; and
the combined context is generated in response to determining that the at least two of the plurality of devices are configured to operate together to perform the computing task.

14. The non-transitory computer-readable medium of claim 9, wherein the combined context is configured to enable the plurality of devices to trigger a private mode according to preconfigured permissions associated with the distributed ambient computing system, the private mode being configured to invoke the preconfigured permissions to obfuscate content associated with the at least two of the plurality of devices and block access to one or more functions associated with the at least two of the plurality of devices.

15. A system comprising:
memory; and
at least one processor coupled to the memory, the at least one processor being configured to cause the system to:
detect a plurality of devices configured as a distributed ambient computing system;

receive a request to execute a computing task;

obtain, from the distributed ambient computing system, data representing a device context for at least two of the plurality of devices;

generate a combined context corresponding to the distributed ambient computing system, the combined context representing a combination of the device context for the at least two of the plurality of devices; and execute the computing task based on the combined context.

16. The system of claim 15, wherein:

the computing task is to configure a service on the at least two of the plurality of devices;

the data includes a device type and an operating system for the at least two of the plurality of devices; and the combined context includes an indication for whether the at least two of the plurality of devices are available for use.

17. The system of claim 15, wherein the system is further configured to:

distribute the combined context to the plurality of devices configured as the distributed ambient computing system, wherein distributing the combined context triggers execution of the computing task on two or more of the plurality of devices.

18. The system of claim 15, wherein:

the request comprises a verbal request;

the combined context further represents the plurality of devices configured for the distributed ambient computing system; and the computing task is distributed for completion on two or more of the plurality of devices based on the combined context.

19. The system of claim 15, wherein:

the device context is based at least in part on device capabilities, preconfigured permissions, and device location; and the combined context is generated in response to determining that the at least two of the plurality of devices are configured to operate together to perform the computing task.

20. The system of claim 15, wherein the combined context is configured to enable the plurality of devices to trigger a private mode according to preconfigured permissions associated with the distributed ambient computing system, the private mode being configured to invoke the preconfigured permissions to obfuscate content associated with the at least two of the plurality of devices and block access to one or more functions associated with the at least two of the plurality of devices.

* * * * *